(12) United States Patent
Allen et al.

(10) Patent No.: US 12,097,929 B2
(45) Date of Patent: *Sep. 24, 2024

(54) BICYCLE GEARBOX HAVING SEGMENTED SPROCKETS

(71) Applicant: Praxis Works LLC, Santa Cruz, CA (US)

(72) Inventors: David Allen, Santa Cruz, CA (US); David M. Earle, Santa Cruz, CA (US); Kyle Bennett, Santa Cruz, CA (US); William A. Hilgenberg, Ben Lomond, CA (US); Rainer Pokorny, Winzendorf (AT); Ryan Kent Miller, Santa Cruz, CA (US)

(73) Assignee: PRAXIS WORKS LLC, Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,880

(22) Filed: Feb. 7, 2023

(65) Prior Publication Data

US 2023/0365221 A1 Nov. 16, 2023

Related U.S. Application Data

(63) Continuation of application No. 16/998,010, filed on Aug. 20, 2020, now Pat. No. 11,572,131, which is a continuation-in-part of application No. 16/792,050, filed on Feb. 14, 2020, now Pat. No. 10,989,281.

(60) Provisional application No. 62/963,064, filed on Jan. 19, 2020, provisional application No. 62/963,063, filed on Jan. 19, 2020, provisional application No. 62/805,746, filed on Feb. 14, 2019.

(51) Int. Cl.
| | | |
|---|---|---|
| B62M 6/55 | (2010.01) | |
| B62M 9/123 | (2010.01) | |
| B62M 9/124 | (2010.01) | |
| F16H 9/24 | (2006.01) | |

(52) U.S. Cl.
CPC .............. *B62M 6/55* (2013.01); *B62M 9/123* (2013.01); *B62M 9/124* (2013.01); *F16H 9/24* (2013.01)

(58) Field of Classification Search
CPC .. F16H 9/24; B62M 9/08; B62M 9/14; B62M 9/123; B62M 9/124; B62M 6/55
USPC ............................. 474/47, 48, 52, 53, 54, 57
See application file for complete search history.

(56) References Cited

U.S. PATENT DOCUMENTS

| | | | | |
|---|---|---|---|---|
| 519,781 | A * | 5/1894 | Timm | F16H 55/54 74/447 |
| 593,932 | A * | 11/1897 | Golding | F16H 55/54 474/47 |

(Continued)

*Primary Examiner* — Henry Y Liu
(74) *Attorney, Agent, or Firm* — Kolitch Romano Dascenzo Gates LLC

(57) ABSTRACT

A gearbox may include a drive spindle and several interconnected gear clusters arranged in a housing. A first of the gear clusters is coaxially fastened to the spindle, and has an outboard gear and an inboard gear. The first gear cluster drives a belt to operate one or more of the other gear clusters, and the inboard gear is physically divided into a plurality of segments. A shifting system for the gearbox includes an actuator configured to urge the segments of the inboard gear of the first gear cluster into and out of the plane of the belt, such that a gear ratio of the gearbox is changeable without displacing the belt out of the plane.

19 Claims, 26 Drawing Sheets

(56) References Cited

U.S. PATENT DOCUMENTS

| | | | | |
|---|---|---|---|---|
| 601,990 A * | 4/1898 | Suter | F16H 55/54 | 74/447 |
| 1,662,037 A * | 3/1928 | Wichtendahl | F16H 9/24 | 474/53 |
| 2,782,649 A * | 2/1957 | Shortland | F16H 9/24 | 474/47 |
| 2,827,795 A * | 3/1958 | Hector | F16H 9/24 | 474/134 |
| 3,769,848 A * | 11/1973 | McGuire | B62M 9/14 | 474/70 |
| 3,861,227 A * | 1/1975 | Hunt | B62M 9/08 | 474/47 |
| 4,127,038 A * | 11/1978 | Browning | B62M 9/12 | 280/236 |
| 4,457,739 A * | 7/1984 | Iseman | F16H 55/54 | 474/69 |
| 4,580,997 A * | 4/1986 | Browning | B62M 9/14 | 474/160 |
| 4,592,738 A * | 6/1986 | Nagano | B62M 9/14 | 474/162 |
| 4,713,042 A * | 12/1987 | Imhoff | B62M 9/14 | 474/69 |
| 5,073,152 A * | 12/1991 | Browning | B62M 9/16 | 474/162 |
| 5,152,720 A * | 10/1992 | Browning | B62M 9/1248 | 474/80 |
| 5,205,794 A * | 4/1993 | Browning | B62M 9/14 | 474/160 |
| 5,312,303 A * | 5/1994 | Hinschlager | B62J 13/04 | 474/146 |
| 5,354,243 A * | 10/1994 | Kriek | B62M 9/14 | 474/135 |
| 5,443,423 A * | 8/1995 | Ha | F16H 55/52 | 474/49 |
| 5,637,046 A * | 6/1997 | Ha | F16H 9/10 | 474/70 |
| 5,984,814 A * | 11/1999 | Davenport | B62M 9/08 | 474/57 |
| 6,173,982 B1 * | 1/2001 | Westergard | B62M 9/14 | 280/261 |
| 6,267,699 B1 * | 7/2001 | Gruich | B62M 9/14 | 474/49 |
| 6,332,853 B1 * | 12/2001 | Bowman | B62J 13/04 | 474/146 |
| 8,257,209 B1 * | 9/2012 | Lane | F16H 9/10 | 474/70 |
| 8,317,644 B1 * | 11/2012 | Bolch | B62J 13/04 | D12/127 |
| 8,753,236 B2 * | 6/2014 | Wong | F16H 9/24 | 474/47 |
| 9,447,852 B2 * | 9/2016 | Williams | F16H 9/24 | |
| 9,499,233 B2 * | 11/2016 | Schuster | B62M 9/14 | |
| 9,816,598 B2 * | 11/2017 | Wong | F16H 9/06 | |
| 10,259,532 B2 * | 4/2019 | Schuster | B62M 9/14 | |
| 2002/0084618 A1 * | 7/2002 | Lerman | B62M 1/36 | 280/281.1 |
| 2005/0215367 A1 * | 9/2005 | Thomasberg | B62M 9/14 | 474/82 |
| 2006/0068956 A1 * | 3/2006 | Matsumoto | B62M 11/00 | 474/80 |
| 2009/0124440 A1 * | 5/2009 | Milne | B62M 9/14 | 474/80 |
| 2013/0267362 A1 * | 10/2013 | Gheciu | B62M 9/105 | 474/164 |
| 2014/0248982 A1 * | 9/2014 | Schuster | B62M 9/06 | 474/69 |
| 2014/0323253 A1 * | 10/2014 | Williams | F16H 9/24 | 474/69 |
| 2016/0257373 A1 * | 9/2016 | Emura | B62K 25/286 | |
| 2017/0233037 A1 * | 8/2017 | Hara | B62M 9/14 | 474/78 |
| 2017/0283006 A1 * | 10/2017 | Schuster | F16H 55/54 | |
| 2018/0290713 A1 * | 10/2018 | Tetsuka | B62M 9/14 | |
| 2019/0135376 A1 * | 5/2019 | Kakinoki | B62M 9/122 | |
| 2021/0003201 A1 | 1/2021 | Wong et al. | | |

\* cited by examiner

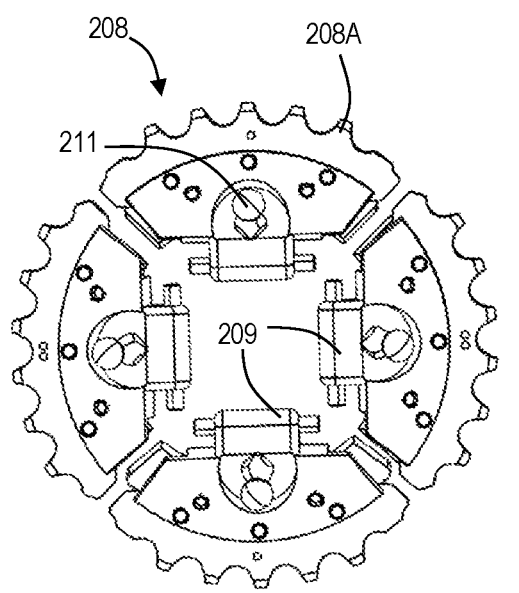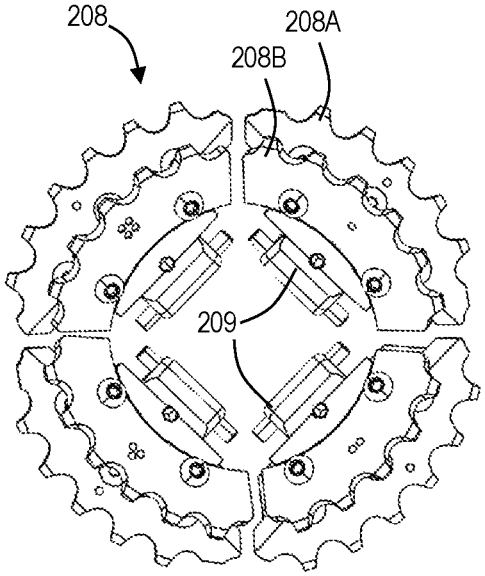
FIG. 17
FIG. 18
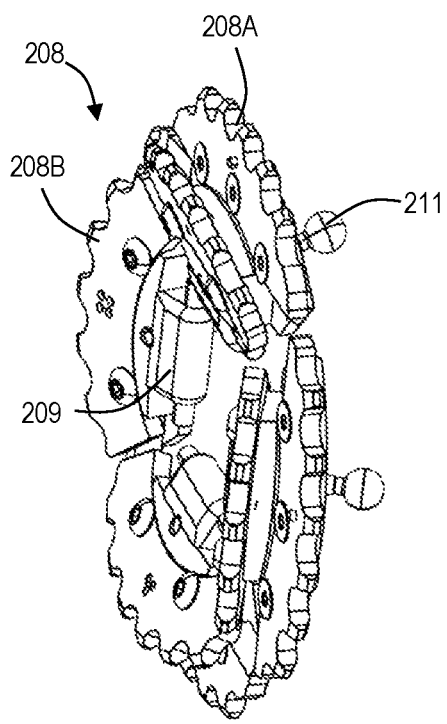
FIG. 19

BICYCLE GEARBOX HAVING SEGMENTED SPROCKETS

CROSS-REFERENCES

The following documents are incorporated herein, in their entireties, for all purposes: U.S. patent application Ser. No. 16/792,050, filed Feb. 14, 2020; and U.S. patent application Ser. No. 16/998,010, filed Aug. 20, 2020.

FIELD

This disclosure relates to systems and methods for shifting gears on a bicycle or other geared vehicle. More specifically, this disclosure relates to gearboxes for electric bicycles and the like.

INTRODUCTION

A bicycle drivetrain transmits power from a rider of a bicycle to the bicycle's wheels. The drivetrain typically includes two pedals attached to respective crankarms on opposing sides of the bicycle frame. The pedals are rotationally coupled to a gearing system, which typically has a plurality of different gear ratios and a mechanism for shifting gears to effect a desired gear ratio. On a bicycle having a gearbox, the gearing system is at least partially enclosed in a gearbox disposed on and/or incorporated into the bicycle frame. An advantage of the gearbox concept is that the gearing system within the box may be protected from exposure to dirt and moisture, as well as from damaging impacts. Another advantage is that the gearbox is suitable for mounting on the bicycle frame adjacent the crankarms, where the weight of the gearbox has a lower impact on bicycle handling than it typically would if the gearbox were mounted elsewhere (e.g., further from the bicycle center of gravity). Further advancements in bicycle gearbox technology are desirable.

SUMMARY

The present disclosure provides systems, apparatuses, and methods relating to a gearbox having segmented sprocket clusters.

In some embodiments, a gearbox for a vehicle may include: a drive spindle; a layshaft spaced from and parallel to the spindle; a first gear cluster coaxially fastened to one of the spindle or the layshaft and rotatable therewith, the first gear cluster including an outboard gear and an inboard gear, wherein the inboard gear is physically divided into a plurality of segments; a second gear cluster coaxially fastened to the other of the spindle or the layshaft and rotatable therewith, the second gear cluster having one or more gears; a continuous belt coupling the first gear cluster to the second gear cluster, such that the belt defines a plane, wherein the segments of the inboard gear of the first gear cluster are each movable into and out of the plane; a chainring coupled to the layshaft, such that the chainring rotates with the layshaft; and a shifting system including an actuator configured to urge the segments of the inboard gear of the first gear cluster into and out of the plane of the belt, such that a gear ratio of the gearbox is changeable without displacing the belt out of the plane.

In some embodiments, a gearbox for a vehicle may include: a drive spindle; a first gear cluster coaxially fastened to the spindle such that the first gear cluster rotates with the spindle, wherein an inboard gear of the first gear cluster includes a plurality of pivotable inboard segments, each of which has a respective pin protruding transversely from an inboard face; a second gear cluster having one or more gears coaxially fastened to a layshaft spaced from and parallel to the spindle, such that the layshaft rotates with the second gear cluster; a continuous first belt coupling the first gear cluster to the second gear cluster, such that the first gear cluster drives the second gear cluster and the first belt defines a first plane, wherein the segments of the inboard gear of the first gear cluster are each pivotable into and out of the first plane; a third gear cluster having one or more gears coaxially fastened to the layshaft and spaced from the second gear cluster, such that the third gear cluster rotates with the layshaft; a fourth gear cluster having one or more gears coupled to a sleeve coaxially mounted over the spindle such that the sleeve rotates independently of the spindle; a continuous second belt coupling the third gear cluster to the second gear cluster, such that the third gear cluster drives the fourth gear cluster and the second belt defines a second plane parallel to the first plane; a chainring fastened to the sleeve, such that the chainring rotates with the fourth gear cluster; and a shifting system including a first shifting wedge transitionable between: (a) a first configuration, in which a first ramped face of the wedge is in line with the pin of each segment of the inboard gear of the first gear cluster when the segment is out of the first plane, such that rotating the pin into the first ramped face is configured to urge the segment into the first plane, and (b) a second configuration, in which a second ramped face of the wedge is in line with the pin of each segment of the inboard gear of the first gear cluster when the segment is in the first plane such that rotating the pins into the second ramped face is configured to urge the segment out of the first plane.

In some embodiments, a gearbox for a vehicle may include: a drive spindle; a first gear cluster coaxially fastened to the spindle such that the first gear cluster rotates with the spindle, the first gear cluster including an outboard gear and an inboard gear, wherein the inboard gear is physically divided into a plurality of segments; a second gear cluster having one or more gears coaxially fastened to a layshaft spaced from and parallel to the spindle, such that the layshaft rotates with the second gear cluster; a continuous first belt coupling the first gear cluster to the second gear cluster, such that the first gear cluster drives the second gear cluster and the first belt defines a first plane, wherein the segments of the inboard gear of the first gear cluster are each movable into and out of the first plane; a third gear cluster having one or more gears coaxially fastened to the layshaft and spaced from the second gear cluster, such that the third gear cluster rotates with the layshaft; a fourth gear cluster having one or more gears coupled to a sleeve coaxially mounted over the spindle such that the sleeve rotates independently of the spindle; a continuous second belt coupling the third gear cluster to the second gear cluster, such that the third gear cluster drives the fourth gear cluster; a chainring fastened to the sleeve, such that the chainring rotates with the fourth gear cluster; and a shifting system including an actuator configured to urge the segments of the inboard gear of the first gear cluster into and out of the first plane, such that a gear ratio of the gearbox is changeable without displacing the first belt out of the first plane.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 17 is a front view of a first gear cluster in accordance with aspects of the present disclosure.

FIG. 18 is a rear view of the gear cluster of FIG. 17.

FIG. 19 is an isometric view of the gear cluster of FIG. 17.

DETAILED DESCRIPTION

Figure 1:
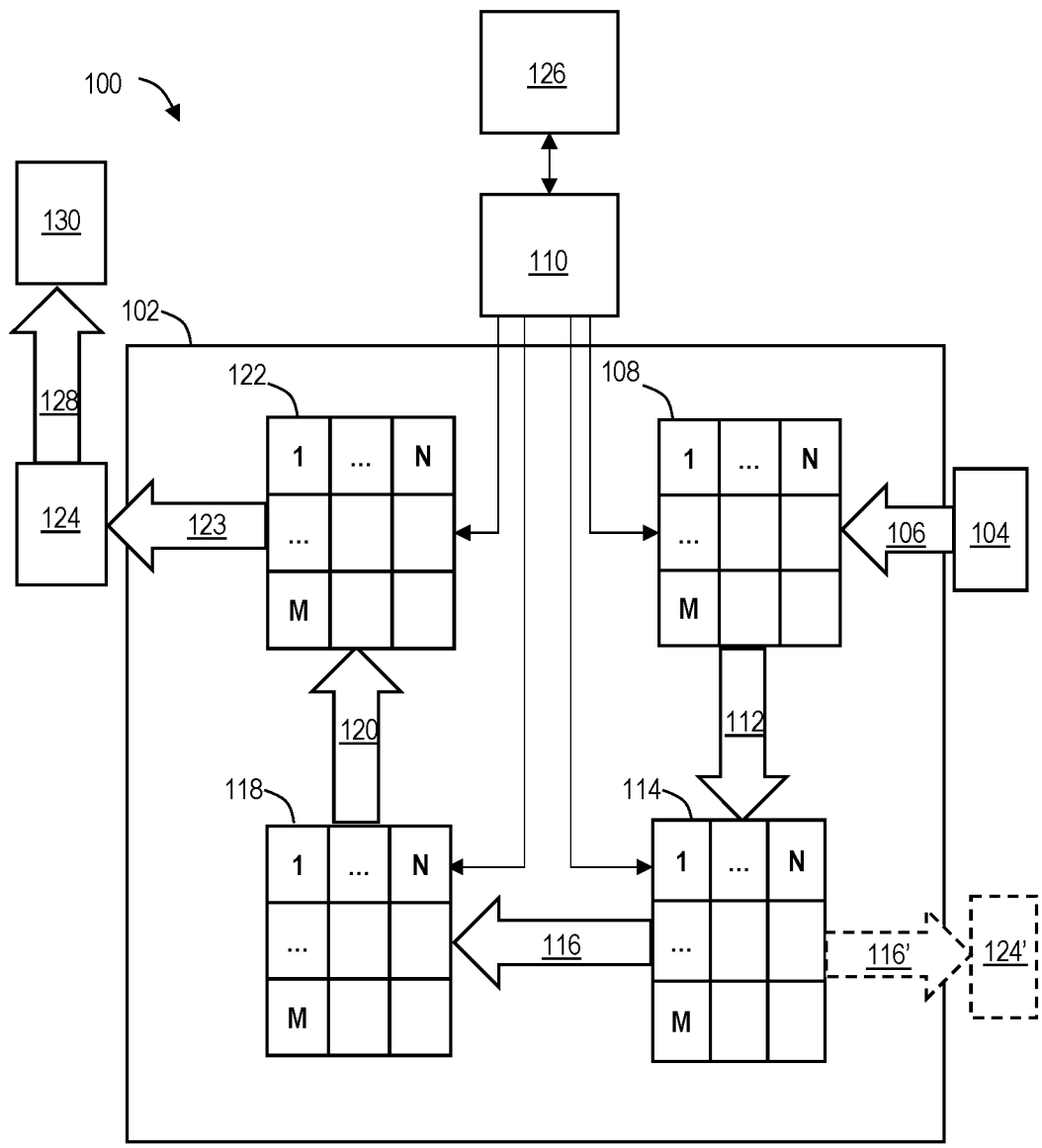
FIG. 1 is a schematic view of an illustrative gearbox in accordance with aspects of the present disclosure.

Various aspects and examples of a gearbox having segmented sprocket clusters and an associated shifting system, as well as related methods, are described below and illustrated in the associated drawings. Unless otherwise specified, a gearbox system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through E, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," and "aft" (and the like) are intended to be understood in the context of a host vehicle, such as a bicycle, on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a component may have a "forward" edge, based on the fact that the component would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a gearbox in accordance with aspects of the present teachings includes gear clusters (AKA cogsets, cassettes, and/or sprocket clusters) coupled by one or more chains and/or belts and at least partially contained within a housing, wherein one or more of the gear clusters has a segmented sprocket. A shifter is configured to move the sprocket segments relative to a plane defined by a chain or belt associated with that sprocket. The housing may be mounted on and/or integral with a bicycle or other suitable vehicle. Each gear cluster includes at least one sprocket, also referred to as a gear. At least one of the gear clusters is mounted on a spindle (AKA an axle or a shaft) coupled at either end to bicycle crankarms (AKA cranks) and/or a drive motor, and at least one other of the gear clusters is mounted on a layshaft. Chains, belts, and/or any other suitable coupling device couple a gear cluster on the spindle to a gear cluster on the layshaft, such that rotation of one of the gear clusters causes rotation of the other gear cluster. Each chain or belt may selectively engage individual sprockets in a cluster. The combination of sprockets coupled to each chain or belt at a given moment determines the current gear ratio of the gearbox.

Shifting gear ratios of the gearbox may include sequential displacement of the segments of a selected segmented gear, such that the chain or belt is shifted onto a different sprocket or gear of the gear cluster without displacing the chain or belt in a lateral direction. Repositioning of the gear segments is performed as each segment is unloaded (i.e., free of the chain/belt), such that shifting may be performed under load without negative consequences. Multiple segmented sprockets of the gearbox may be simultaneously shifted in this manner, if desired.

Examples, Components, and Alternatives

The following sections describe selected aspects of exemplary bicycle gearboxes as well as related systems and/or methods. Although described in terms of bicycles and electric bicycles, gearboxes of the present disclosure may be utilized in any suitable application, such as on a motorized two- or three-wheeled vehicle. The examples in these sections are intended for illustration and should not be interpreted as limiting the entire scope of the present disclosure. Each section may include one or more distinct embodiments or examples, and/or contextual or related information, function, and/or structure.

A. Schematic Diagram of a Gearbox of the Present Disclosure

As shown schematically in FIG. 1, this section describes an illustrative gearbox 100 having segmented gear clusters. Gearbox 100 includes a housing 102 having a gearing system disposed within. The gearing system includes a plurality of (e.g., four) gear clusters, namely a first gear cluster 108, a second gear cluster 114, a third gear cluster 118, and a fourth gear cluster 122, arranged as shown in FIG.

1. Each gear cluster has a plurality of individual gears labeled 1 through N. Each gear of the cluster has a plurality of individual gear segments labeled 1 through M. In some examples, each gear of each gear cluster has the same number of gear segments. In some examples, the number of segments may vary from gear to gear.

Each gear comprising gear segments is referred to as a segmented gear. Each gear segment is shaped as an annular sector. In some examples, a segmented gear comprises four gear segments. A selected gear of each gear cluster is coupled to (i.e., engaged with) a chain by teeth arranged around a periphery thereof. In some examples, two or more gear clusters may be engaged with the same chain. Each gear segment of a segmented gear is movable with respect to the chain. The movement of gear segments is utilized to shift between gear ratios. In some examples, each gear segment may be pivotable about a hinge joint disposed at an axle end of the segment. In some examples, each gear segment may be linearly displaceable (e.g., translated or shifted axially).

Gearbox 100 includes an associated shifting system 110. Shifting system 110 is configured to individually move segments of the segmented gears into and out of engagement with the respective chain. Shifting system 110 may be coupled to a controller 126, which is configured to send command signals to one or more actuators of the shifting system to change gear ratios. For example, controller 126 may signal the shifting system to increase the gear ratio. Shifting is described further in sections below.

In principle, gearbox 100 may be operable with any gear ratio achievable by the installed cogsets. In some cases, however, controller 126 is configured to allow a rider to select only a subset of gear ratios. For example, in some cases two or more different combinations of gears may produce identical or nearly identical gear ratios. Providing the vehicle operator with a set of selectable gear combinations that includes different gear combinations that result in substantially the same gear ratio may be unhelpful and confusing. Accordingly, shifting system 110 and/or controller 126 may be configured to enable selection of only one of the redundant gear combinations.

Gearbox 100 includes a crankset 104 disposed outside of housing 102 and coupled to a spindle 106. Spindle 106 passes through housing 102 to engage first gear cluster 108, such that rotation of the crankset causes rotation of the spindle which, in turn, causes rotation of the first gear cluster.

First gear cluster 108 is coupled to a first chain 112 such that rotation of the gear cluster causes rotation of the chain. First chain 112 may be oriented orthogonally with respect to spindle 106.

First chain 112 is coupled to second gear cluster 114, thereby transmitting power from cluster 108 to cluster 114. Second gear cluster 118 is coupled to third gear cluster 118 via a layshaft 116. Accordingly, rotation of chain 112 using the crankshaft and first gear cluster drives the rotation of second gear cluster 114, which rotates layshaft 116 and third gear cluster 118. Layshaft is generally parallel to and spaced from spindle 106. Third gear cluster 118 is coupled to a second chain 120 which is further coupled to a fourth gear cluster 122, such that rotation of third gear cluster 118 causes rotation of fourth gear cluster 122.

Fourth gear cluster 122 is coupled to an external chainring 124 (i.e., disposed outside of housing 102) via an output shaft 123 that passes through housing 102. Output shaft 123 is coaxial with spindle 106, such that spindle 106 passes through the center of output shaft 123. Spindle 106 and output shaft 123 are configured to rotate independently with respect to one another. Chain ring 124 is coupled to an output system130 (e.g., a rear wheel) via a third chain 128.

In some examples, more or fewer gear clusters and/or layshafts may be included. For example, a two-cluster version of gearbox 100 may include first gear cluster 108 on spindle 106, chain 112, and second gear cluster 114 on layshaft 116. In this example, gear clusters 118 and 122 are excluded, and the drive output is via a chainring 124' coupled to layshaft 116' as shown in dashed outline in FIG. 1. In other examples, additional gear clusters may be interspersed with those shown in FIG. 1, to provide additional gear ratios and combinations.

B. First Illustrative Gearbox

This section describes a gearbox 200, which is an example of gearbox 100 described above. See FIGS. 2-27.

Figure 2:
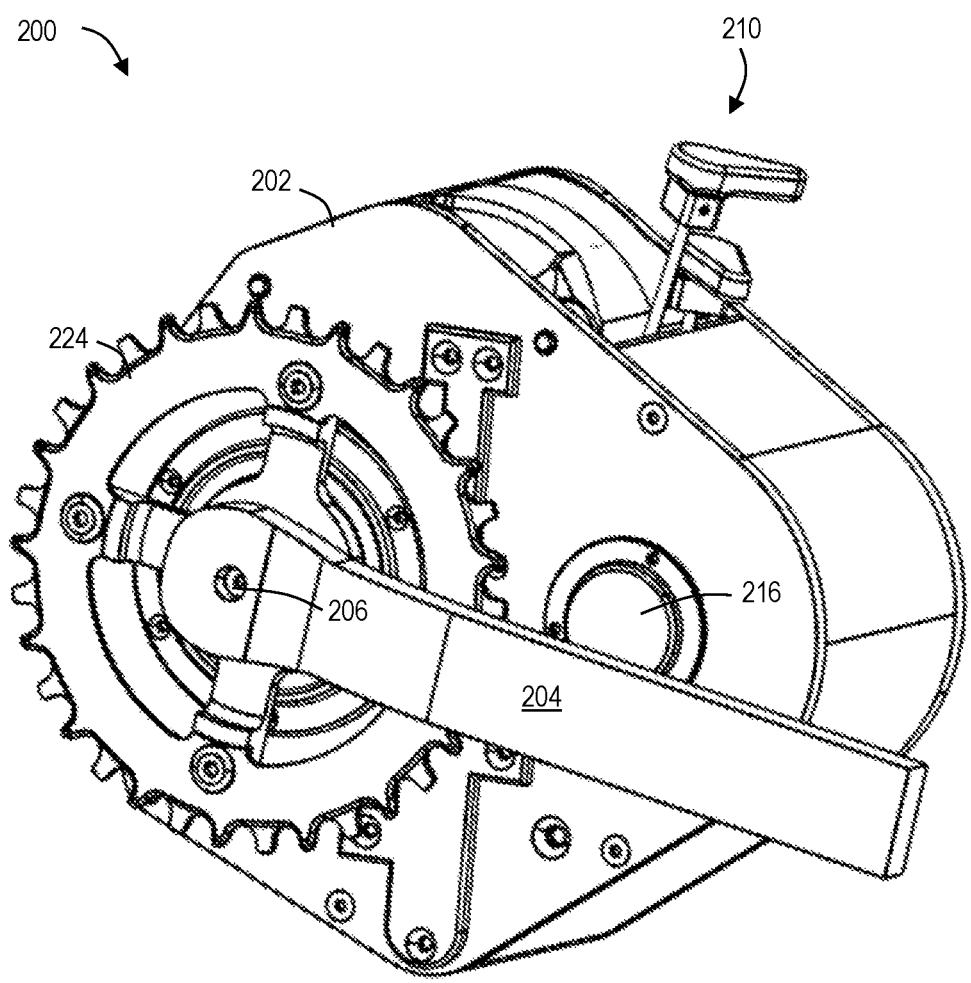
FIG. 2 is an isometric view of a gearbox which is an example of the gearbox depicted in FIG. 1.
Figure 3:
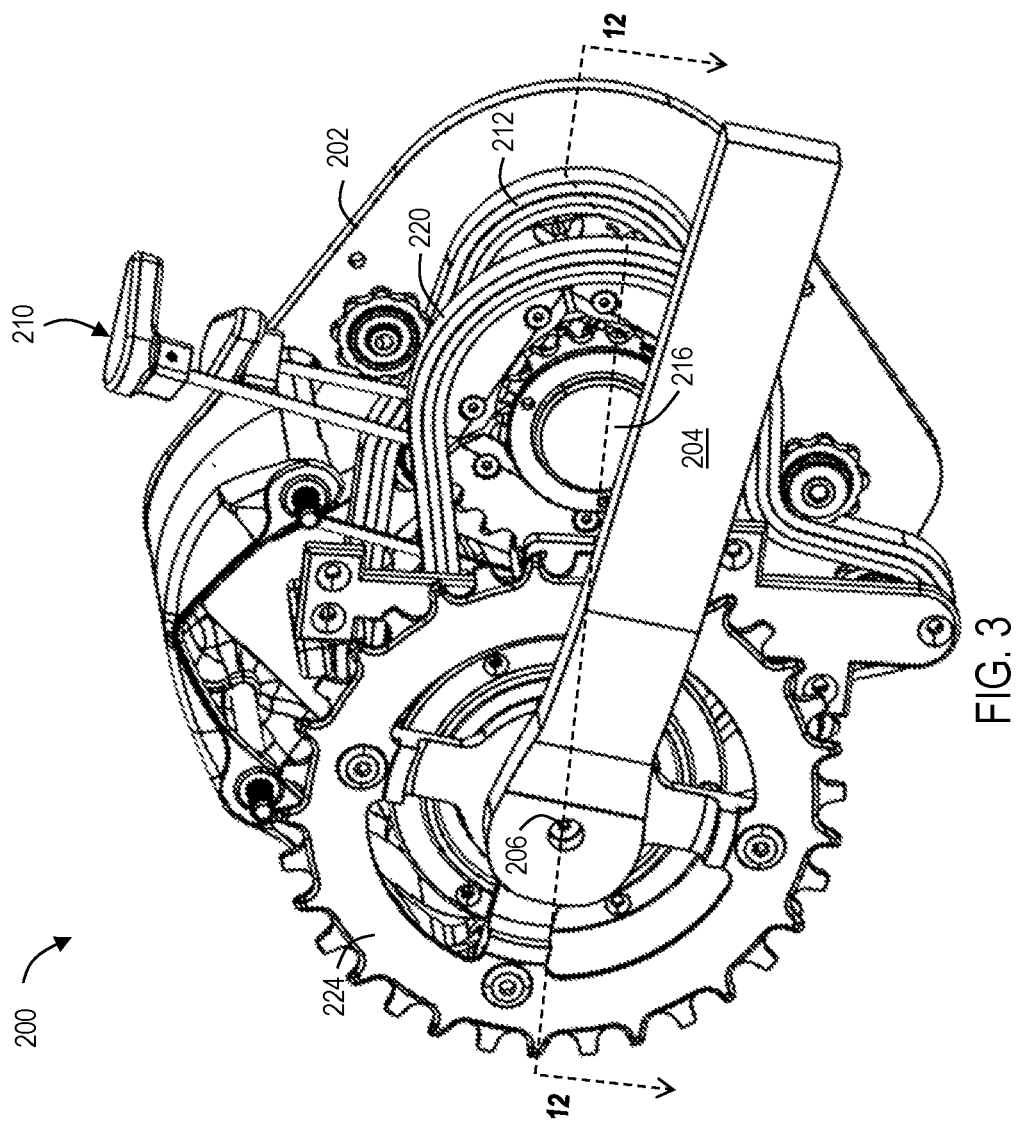
FIG. 3 is an isometric view of the gearbox of FIG. 2 with portions of the housing removed.

As shown in FIGS. 2 and 3, gearbox 200 includes a housing 202. The housing at least partially contains a gearing system, as described above. An Illustrative gearing system for gearbox 200 is described further below. A spindle 206 extends through the housing. A first crankarm 204 and a second crankarm (not shown) are coupled to respective ends of spindle 206. A chainring 224 couples gearbox 200 to a wheel, e.g., a rear wheel, via an external drive chain or belt (not shown).

Figure 4:
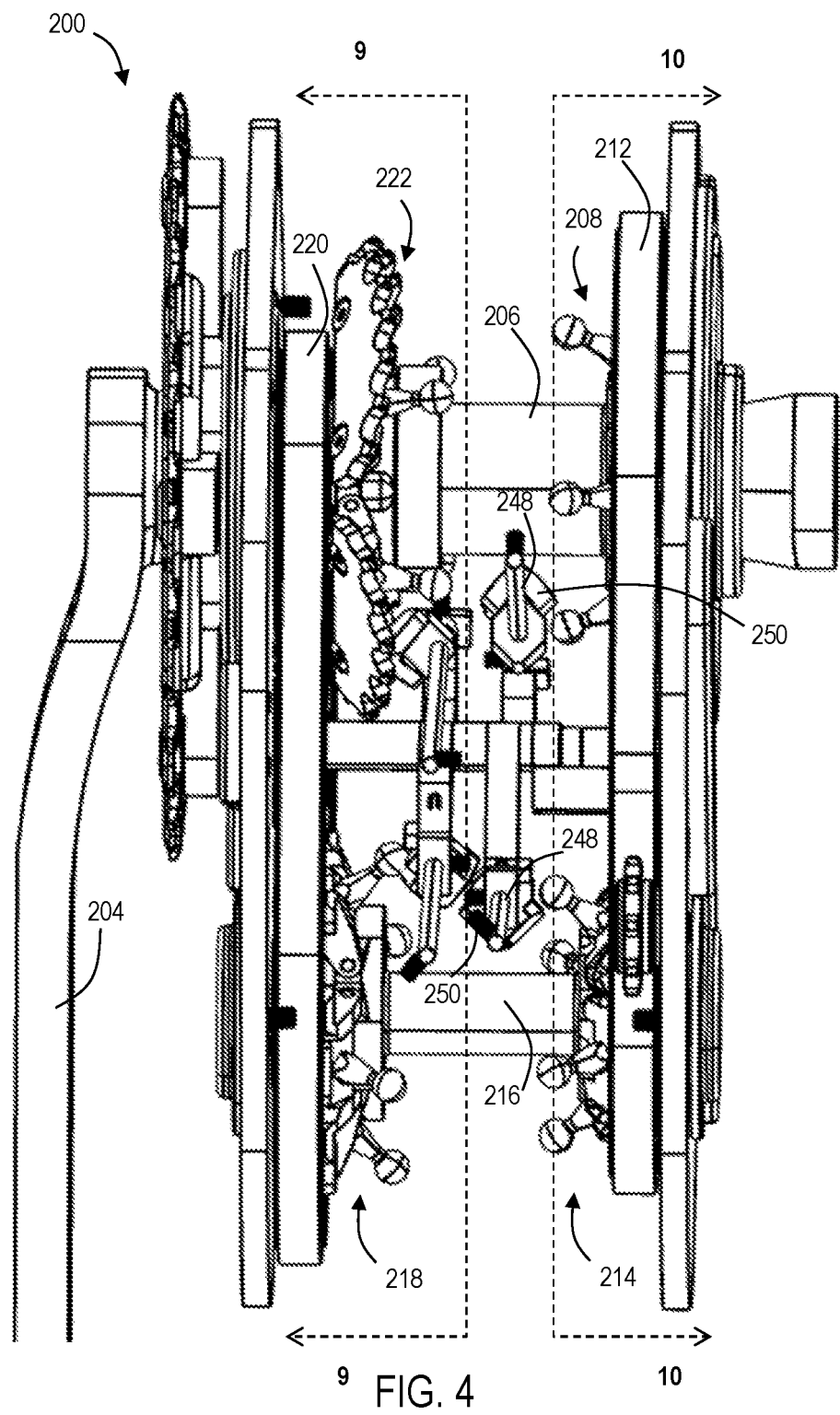
FIG. 4 is a top-down view of the gearbox of FIG. 2 with the housing removed.

FIG. 4 is a top view of gearbox 200. Gearbox 200 includes a layshaft 216 and four gear clusters: a first (input) gear cluster 208 (also referred to as cluster 1) disposed on spindle 206, a second gear cluster 214 (also referred to as cluster 2) disposed on layshaft 216, a third gear cluster 218 (also referred to as cluster 3) disposed on layshaft 216, and a fourth gear cluster 222 (also referred to as cluster 4) disposed on an output shaft 223 (AKA a driven shaft), an example of output shaft 123. First gear cluster 208 is coupled to second gear cluster 214 by a first chain 212. Similarly, third gear cluster 218 is coupled to fourth gear cluster 222 by a second chain 220.

Accordingly, rotation of spindle 206 (e.g., by a bicycle rider operating pedals attached to the crankarms and/or by a motor) transmits power from first gear cluster 208 via first chain 212 to second gear cluster 214, and from the second gear cluster via the layshaft to third gear cluster 218. Second chain 220 transmits power from third gear cluster 218 to fourth gear cluster 222, and power is transmitted from the fourth gear cluster via output shaft 223 to chainring 224, and/or to another suitable system.

Each of the gear clusters may include a plurality of gears, one or more gears of the plurality of gears having a plurality of gear segments. Gears comprising gear segments may be referred to as segmented gears. Each gear segment may be shaped as an annular sector. In one example, each segmented gear comprises four gear segments. Each gear segment is rotatably attached to a hinge disposed near the center of the segmented gear. One or more gear clusters may have a non-segmented sprocket having a smaller diameter than the respective segmented gear. Each gear segment may be attached to a pin. Each gear segment pivots (or folds) in a direction transverse to the plane of the gear. In other words, each gear segment may transition between a coplanar position and a pivoted (AKA folded) position. This configuration may enable a segmented gear to transition (e.g., stepwise) between a coplanar configuration (i.e., with all segments aligned to form a substantially coplanar gear) and a pivoted (AKA pyramidal) configuration (i.e., with all gear segments rotationally skewed in the same direction away from the plane formed in the coplanar configuration)

As shown in FIG. 4, a shifting system 210 is disposed at least partially within the gearbox, in a generally central location. Shifting system 210 is an example of shifting system 110 described above.

Shifting system 210 includes a shift rod 248 attached to a shift wedge 250 configured to selectively and mechanically interface with portions of the gear segments. Although shift rods are depicted and described herein, any suitable actuator configured to rotate the shift wedges may be utilized, such as a flexible cable or the like, whether manually or electromechanically operated, e.g., by an electronic controller. Manual handles at the upper ends of the shift rods, depicted in FIG. 3 and elsewhere, are shown for purposes of understanding, e.g., where a controller would actuate the shifting system.

Shift wedge 250 includes a pair of ramps referred to herein as a ramped first face 252 and a ramped second face 254 (i.e., a first ramp and a second ramp), generally configured such that planar extensions of each face intersect at an angle (e.g., an acute angle). Rotation of shift rod 248 simultaneously rotates shift wedge 250, thereby changing the orientation of shift wedge 250 (and the first and second faces/ramps).

Figure 25:
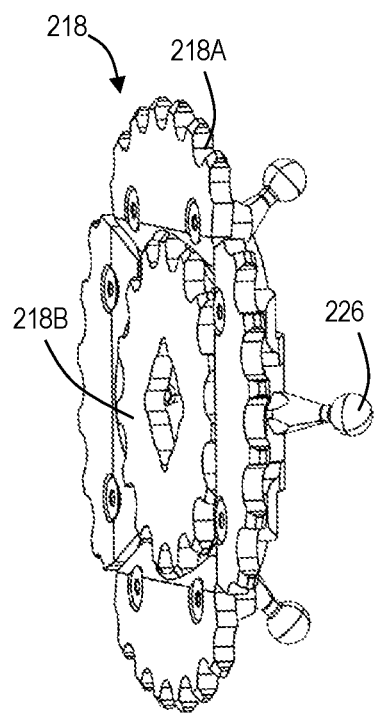
FIG. 25 is an isometric view of the gear cluster of FIG. 23.
Figures 26, 27:
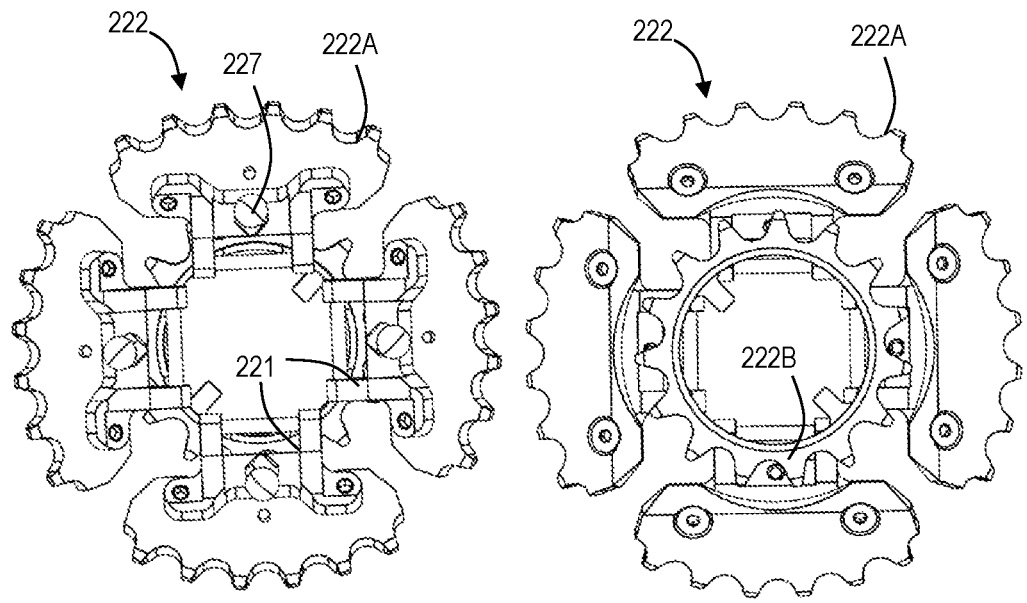
FIG. 26 is a front view of a fourth gear cluster in accordance with aspects of the present disclosure.
FIG. 27 is a rear view of the gear cluster of FIG. 26.

In the current example, shifting system 210 has a shift rod and shift wedge for each gear cluster. In some examples, two or more gear clusters may share a shift wedge. For example, third gear cluster 218 and fourth gear cluster 222 may share the same shift wedge. FIGS. 25 and 26 depict system 210 shifting the gear ratio of gearbox 200 by causing the segments of a segmented gear to pivot into or out of alignment with the chain.

Figure 5:
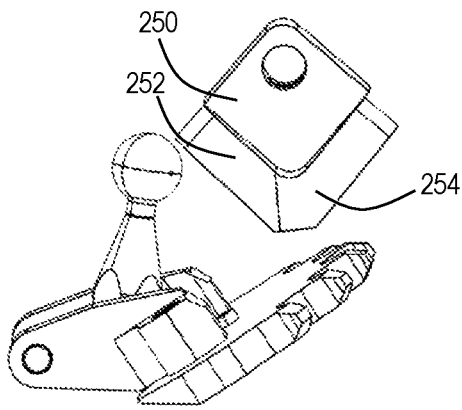
FIG. 5 is an illustrative gear segment in a pivoted position and shift wedge in a first position in accordance with aspects of the present disclosure.

FIGS. 5-8 depict a portion of the shifting system to facilitate the following description thereof. Each of FIGS. 5-8 depict a single gear segment, which is rotating in a generally horizontal plane into the page, and a shift wedge in a series of positions configured to either cause the gear segment to pivot in a selected direction or to avoid the gear segment, as the case may be. FIG. 5 is an isometric view of the single gear segment and shift wedge 250. Shift wedge 250 is in a first position configured such that the shift wedge does not interfere with the pin of the gear segment. In this configuration, the gear segment is in its pivoted position. This position of the gear segment corresponds to a first gear ratio in which the present gear segment is tilted out of the plane of the chain (i.e., not engaged with the chain).

Figure 6:
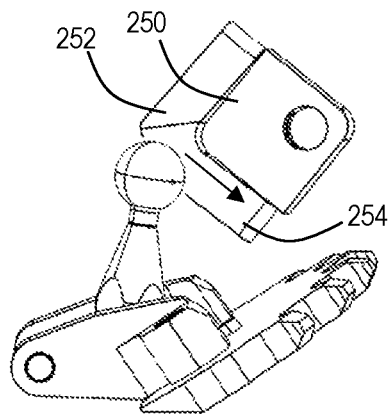
FIG. 6 is an illustrative gear segment in a pivoted position and shift wedge in a second position in accordance with aspects of the present disclosure.

In FIG. 6, shift wedge 250 is shown in a second position configured such that the shift wedge is in the path of the pin of the gear segment. More specifically, in this position, second face 254 has been brought into the path of the pin of the gear segment. Accordingly, further rotation of the gear segment brings the pin into contact with second face 254 and thereby slides along face 254 in the direction indicated by the arrow. This pivots the gear segment into its coplanar position (see FIG. 7) (i.e., in the plane of the chain) and thus the chain engages the segment.

Figure 7:
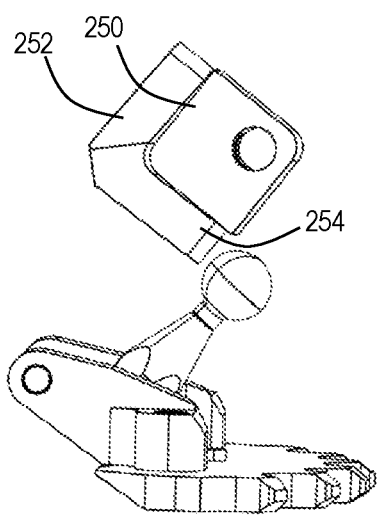
FIG. 7 is an illustrative gear segment in a planar position and shift wedge in a second position in accordance with aspects of the present disclosure.
Figure 8:
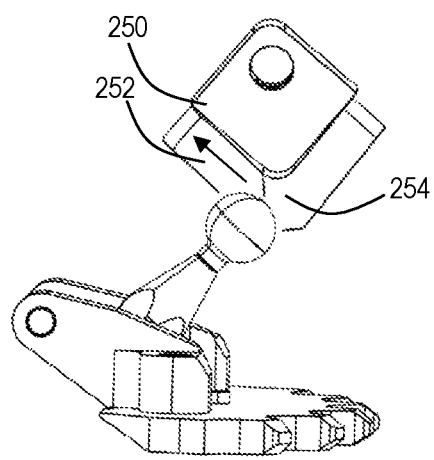
FIG. 8 is an illustrative gear segment in a planar position and shift wedge in a first position in accordance with aspects of the present disclosure.

FIG. 7 depicts the gear segment in its coplanar position and shift wedge 250 in the second position. In this configuration, the shift wedge does not interfere with the pin of the gear segment. In other words, this configuration corresponds to operation of the system in a second gear ratio in which the present gear segment is engaged with the chain and able to freely rotate without striking the shift wedge.

In FIG. 8, shift wedge 250 is again in the first position. Because the gear segment is coplanar with the chain, the shift wedge is now in the path if the pin of the gear segment. More specifically, in this position, first face 252 has been brought into the path of the pin of the gear segment. Accordingly, further rotation of the gear segment brings the pin into contact with first face 252 and thereby slides along face 252 in the direction indicated by the arrow. This pivots the gear segment into its pivoted (i.e., non-coplanar) position, and the gear segment and wedge are again as depicted in FIG. 5.

Accordingly, shifting system 210 includes a shifting wedge transitionable between: (a) a first configuration, in which a first ramped face of the wedge is in line with the pin of each segment of the inboard gear of the first gear cluster when the segment is out of the plane of its chain, such that rotating the pin into the first ramped face is configured to urge the segment into the plane of the chain, and (b) a second configuration, in which a second ramped face of the wedge is in line with the pin of each segment of the inboard gear of the first gear cluster when the segment is in the plane of its chain, such that rotating the pins into the second ramped face is configured to urge the segment out of the plane of the chain.

Figure 9:
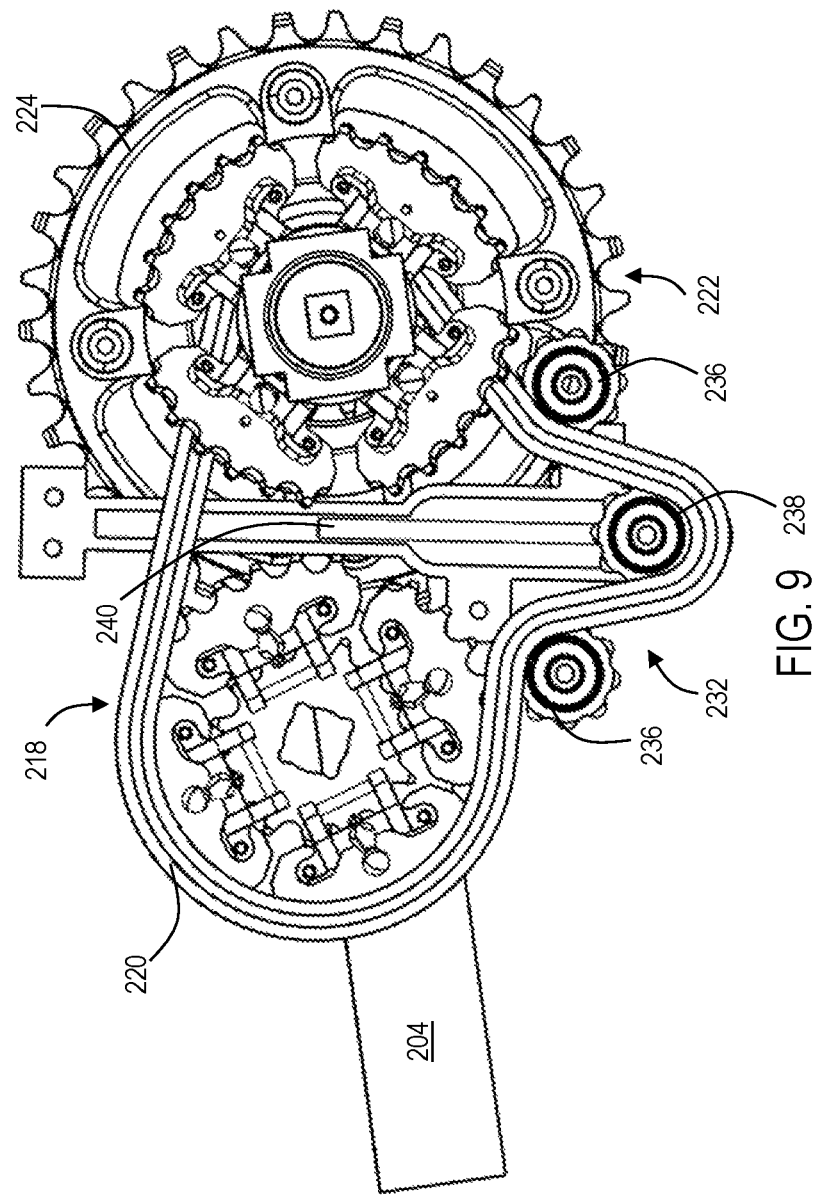
FIG. 9 is a sectional view of the gearbox of FIG. 2 taken along a line indicated in FIG. 4.

As shown in FIG. 9, gearbox 200 includes a first chain tensioner 232. Chain tensioner 232 has at least one idler 236 having a fixed location and at least one adjustable gear 238 configured to be moved or translated by a pushrod 240. In some examples, chain tensioner 232 includes two idlers and one adjustable gear. A spring is coaxially mounted to pushrod 240 to provide a biasing force. Chain tensioner 232 may be configured to engage any of the chains described above. In the current example, idler 236 and gear 238 of chain tensioner 232 are configured to engage chain 220. Accordingly, chain 220 interfaces with third gear cluster 218, fourth gear cluster 222, and chain tensioner 232.

Chain tensioner 232 is configured such that pushrod 240 can be utilized to displace gear 238, thereby applying more or less tension to the engaged chain. Manipulation of pushrod 240 may be manual (e.g., by a user), and/or may be automatic (e.g., using mechanical and/or electric components).

Figure 10:
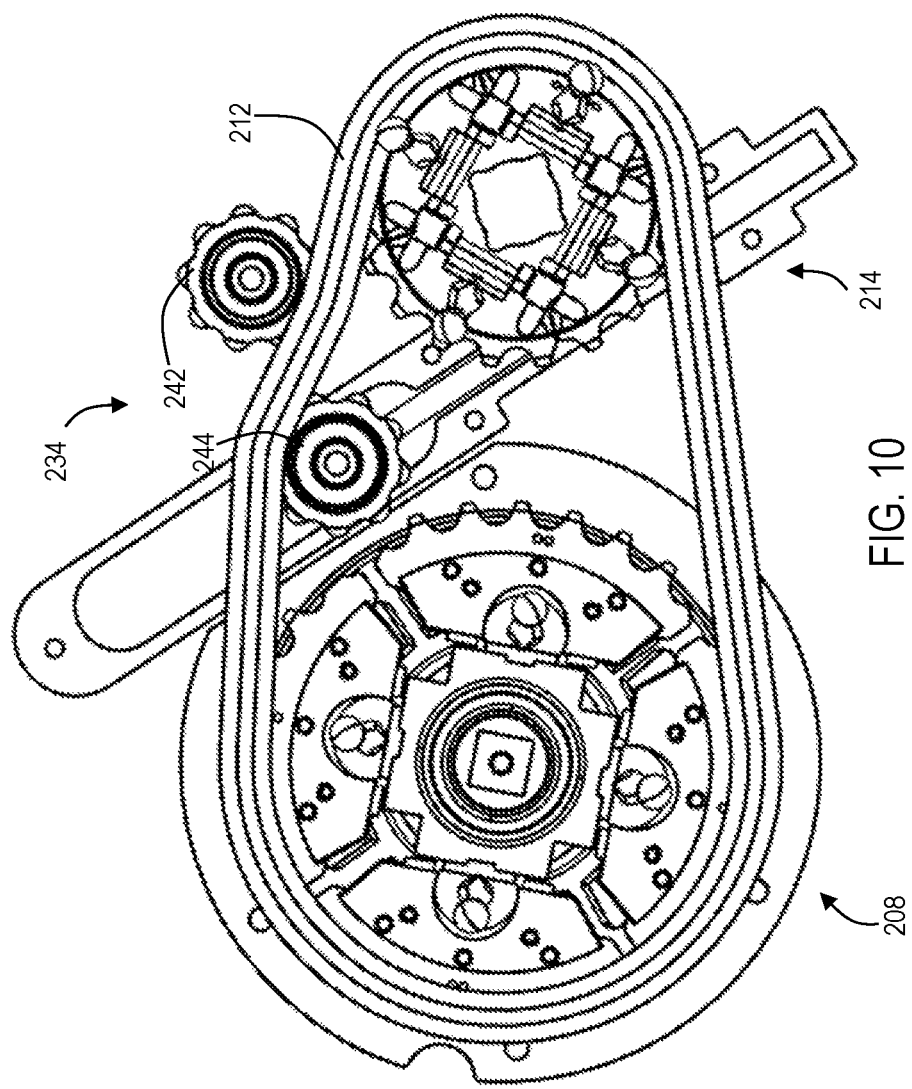
FIG. 10 is a sectional view of the gearbox of FIG. 2 taken along a line indicated in FIG. 4.

As shown in FIG. 10, gearbox 200 includes a second chain tensioner 234, which is substantially similar to chain tensioner 232. In the current example, chain tensioner 234 includes a single idler 242 and a movable gear 244 attached to a pushrod 246. Second chain tensioner is configured to engage first chain 212. Accordingly, chain 212 is configured to interface with first gear cluster 208, second gear cluster 214, and chain tensioner 234. Any suitable chain tensioners may be utilized.

Figure 11:
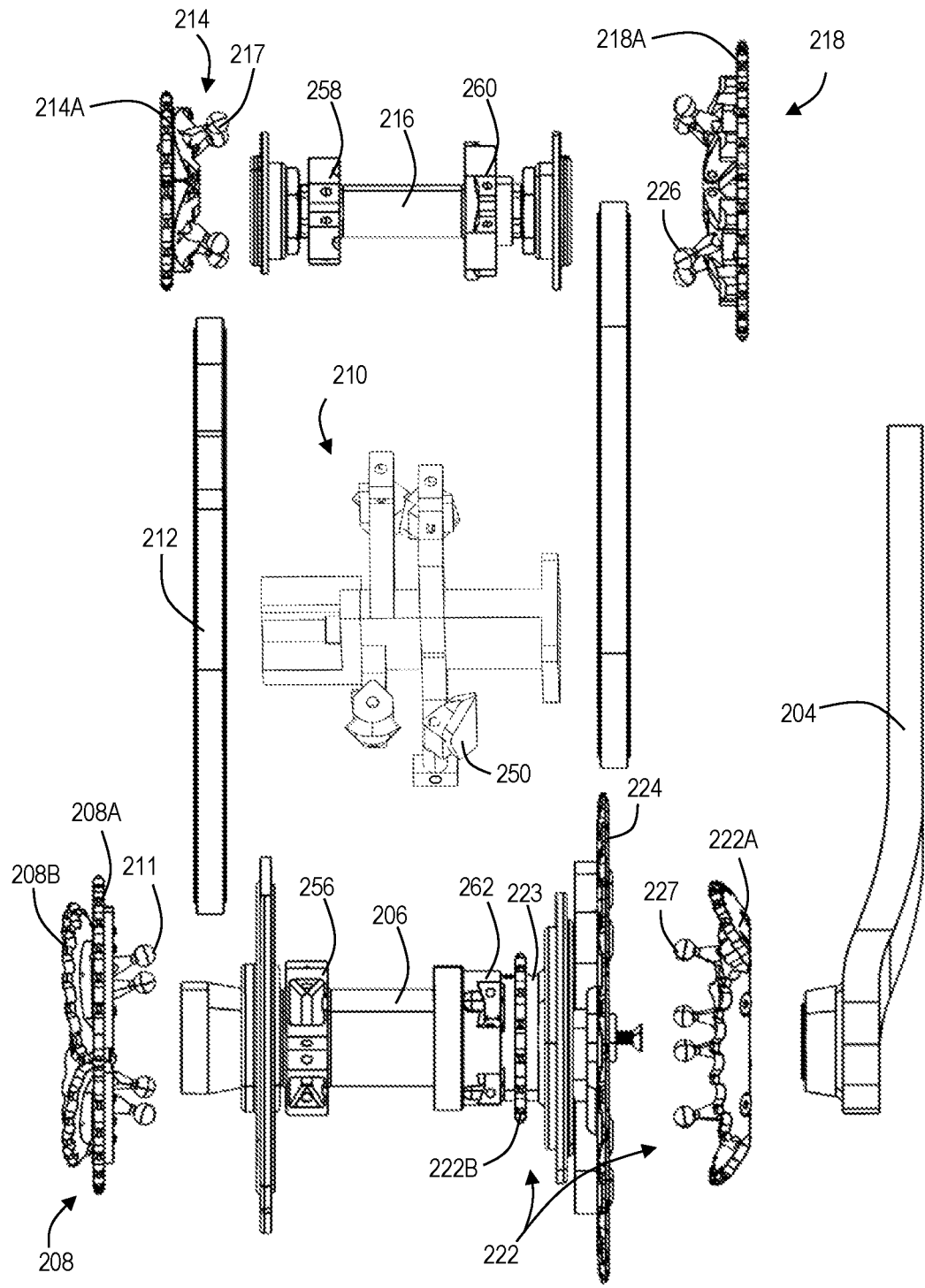
FIG. 11 is an exploded view of the gearbox of FIG. 2.

FIG. 11 depicts an exploded view of portions of gearbox 200. The first gear cluster is configured to be driven by the vehicle's prime mover (e.g., human-powered pedaling and/or electric motor) via spindle 206. Each gear of first gear cluster 208 is configured to selectively engage first chain 212, which may include one or more chains, belts, and/or any other suitable devices.

In the current example, first gear cluster 208 comprises two segmented gears, 208A and 208B. Affixed to each gear segment of segmented gear 208A is a pin 211. Each gear segment of segmented gear 208A shares a common hinge portion 209 with a corresponding gear segment of segmented gear 208B, in a fixed angular relationship. Hinge portion 209 is configured to mate with a hinge receiver 256 disposed on spindle 206. Hinge receiver 256 may be unitary with spindle 206 or may be affixed by a suitable mechanism (e.g., screws, friction fit, etc.). Corresponding segments of the two gears are configured to pivot together, rather than independently (see FIGS. 17-19). In other words, when a segment of gear 208A is shifted out of the plane of chain 212, the corresponding segment of 208B is brought into the plane of chain 212 (thereby engaging the chain).

First gear cluster 208 is coupled to second gear cluster 214 by first chain 212. The system is configured such that first chain 212 directly engages a single one of the gears of first gear cluster 208 and a single one of the gears of second gear cluster 214 at any given time; however, the chain may partially engage more than one of the gears of each cluster at some stages of operation, such as when the chain is being segmentally shifted from one gear to another (e.g., in response to user and/or controller input).

Second gear cluster 214 is securely mounted on layshaft 216 such that rotation of second gear cluster 214 also rotates the layshaft. Second gear cluster 214 has a nested arrangement, such that a segmented gear 214A and a non-segmented sprocket 214B are nestable together (see FIGS. 20-22). Affixed to the inboard face of each gear segment of segmented gear 214A is a pin 217. Each gear segment of segmented gear 214A includes a hinge portion 215 coupled to a hinge receiver 258 disposed on layshaft 216. Hinge receiver 258 may be unitary with layshaft 216 or may be affixed by a suitable fastening mechanism (e.g., screws, friction fit, etc.).

Figures 23, 24:
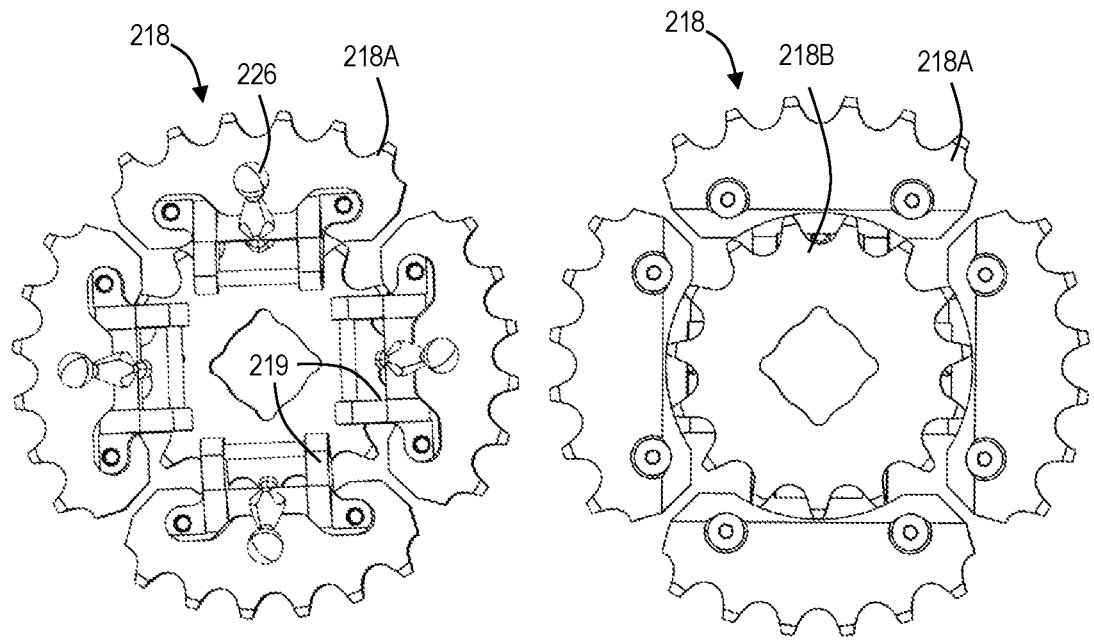
FIG. 23 is a front view of a third gear cluster in accordance with aspects of the present disclosure.
FIG. 24 is a rear view of the gear cluster of FIG. 23.

Third gear cluster 218 comprises a segmented gear 218A and a non-segmented sprocket 218B nestable therein (see FIGS. 23-25). Affixed to the inboard face of each gear segment of segmented gear 218A is a pin 226. Each gear segment of segmented gear 218A includes a hinge portion 219 coupled to a hinge receiver 260 disposed on layshaft 216. Hinge receivers 258 and 260 may be unitary with layshaft 216 or may be affixed by a suitable mechanism (e.g., screws, friction fit, etc.).

Third gear cluster 218 is configured to engage second chain 220. Second chain 220 couples a selected one of the gears to fourth gear cluster 222, thereby transmitting rotation of third gear cluster 218 to fourth gear cluster 222. Typically, second chain 220 directly engages a single one of gears of third gear cluster 218 and fourth gear cluster 222 at any given time; however, the chain may engage more than one of the gears of the clusters at some stages of operation, such as when the chain is being shifted from one gear to another (e.g., in response to user and/or controller input).

Fourth gear cluster 222 is securely mounted on output shaft 223 such that the output shaft rotates with the fourth gear cluster. Fourth gear cluster 222 comprises a segmented gear 222A and a non-segmented sprocket 222B (see FIGS. 26-28). Affixed to the inboard face of each gear segment of segmented gear 222A is a pin 227. Sprocket 222B includes an opening for mating with output shaft 223. Each gear segment of segmented gear 222A includes a hinge portion 221 configured to mate with a hinge receiver 262 disposed on layshaft 216. Hinge receiver 258 may be unitary with layshaft 216 or may be attached by a suitable mechanism (e.g., screws, friction fit, etc.).

Figure 12:
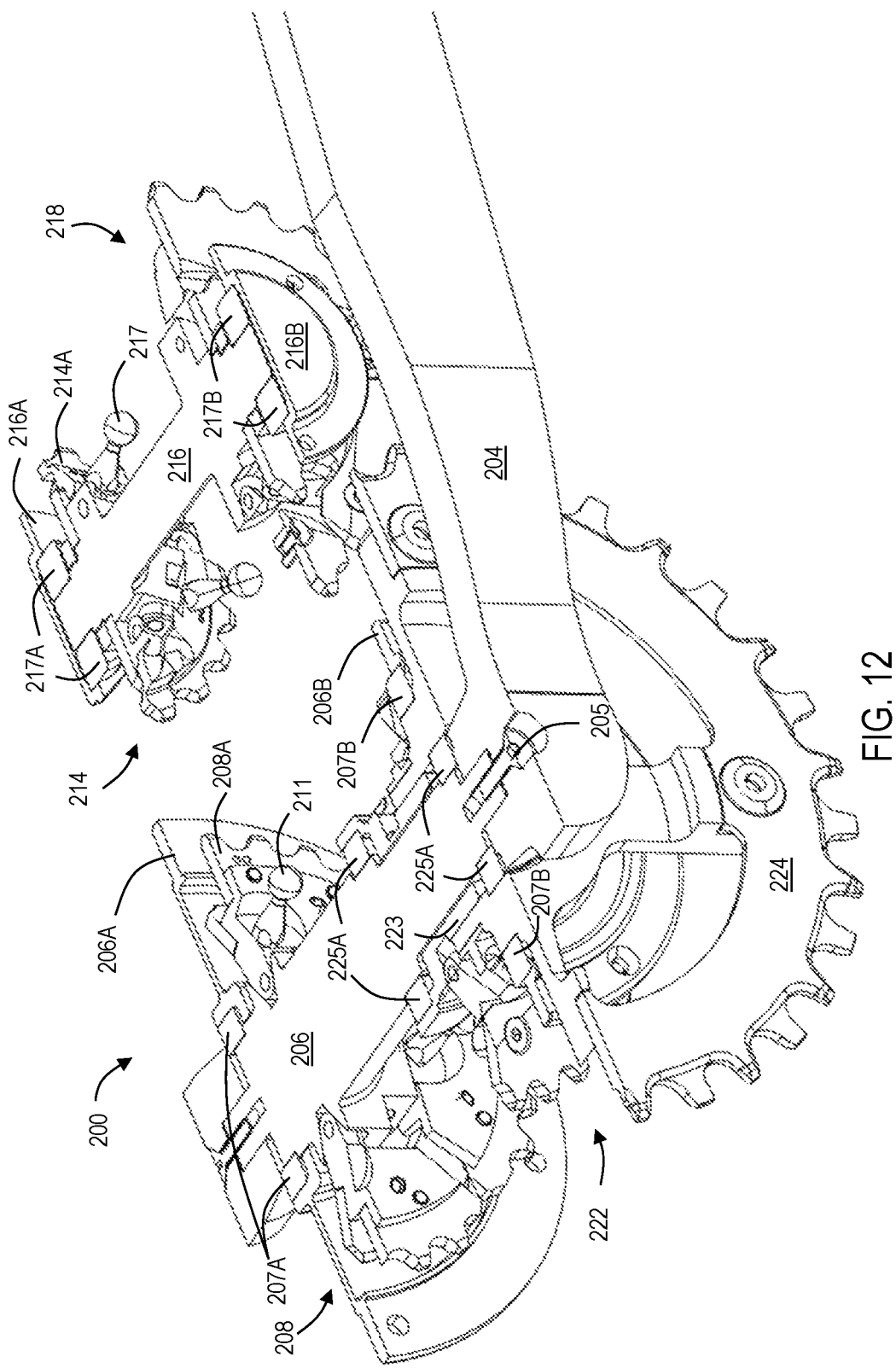
FIG. 12 is a section view of the gearbox of FIG. 2 taken along a line indicated in FIG. 3.

Hollow output shaft 223 (AKA an output sleeve) surrounds and is coaxial with spindle 206 (see. FIG. 12), such that the output shaft and the spindle are freely able to rotate independently of one another. Output shaft 223 is affixed to chainring 224 (e.g., by a spider), such that the chainring rotates with the output shaft independently of the spindle. Chainring 224 thus transmits power from gearbox 200 to an external system, typically a rear wheel of a bicycle or another suitable wheel or vehicle.

FIG. 12 depicts a sectional view of the gearing system of gearbox 200 taken at line 12-12 of FIG. 3. Crank arm 204 is coupled to spindle via crank screw 205. Output shaft 223 is situated coaxially on an end of spindle 106 and rotationally isolated from the spindle by bearings 225A and 225B.

Disposed at one end of spindle 206 is a flange 206A and disposed at the opposite end, encircling output shaft 223 is a flange 206B. Spindle 206 is rotationally isolated from flange 206A via bearing 207A, and similarly, output shaft 223 is rotationally isolated from flange 206B via bearing 207B.

Similarly, disposed at one end of layshaft 216 is a flange 216A and disposed at the opposite end is a flange 216B. Layshaft 216 is rotationally isolated from flange 216A via bearing 117A, and similarly, layshaft 216 is rotationally isolated from flange 216B via bearing 117B.

Figure 13:
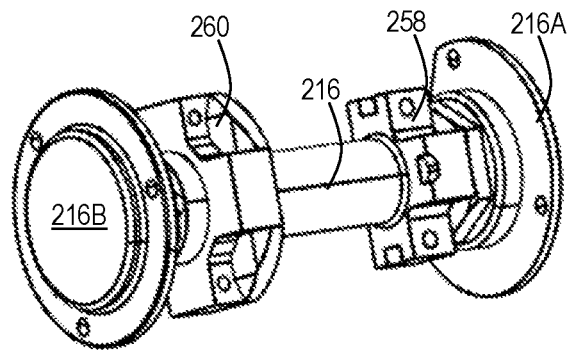
FIG. 13 is an isometric view of a layshaft in accordance with aspects of the present disclosure.
Figure 14:
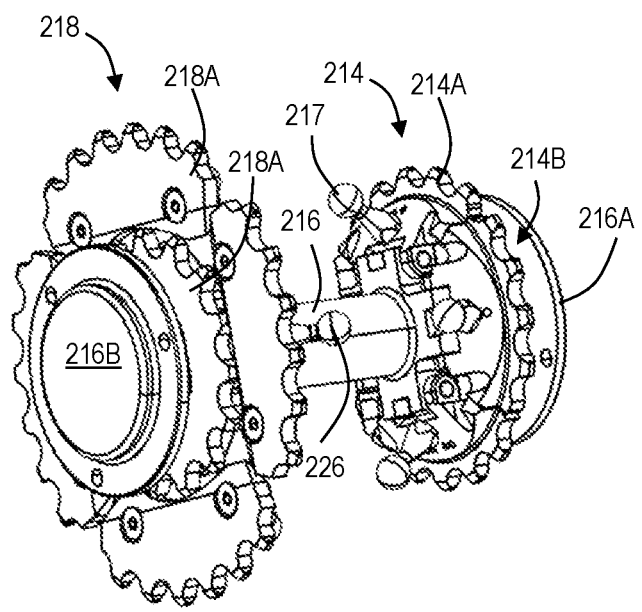
FIG. 14 is an isometric view of the layshaft of FIG. 13 having gear clusters attached thereon.

FIGS. 13 and 14 show layshaft 216 with gear clusters 214 and 218 removed and coupled, respectively. As shown in FIGS. 13 and 14, sprocket 214B mates with layshaft 216 in the space between hinge receiver 258 and flange 216A. Similarly, sprocket 218B mates with layshaft 216 in the space between hinge receiver 260 and flange 216B. FIGS. 17-28 depict various views of portions of the gear clusters described above.

Figure 15:
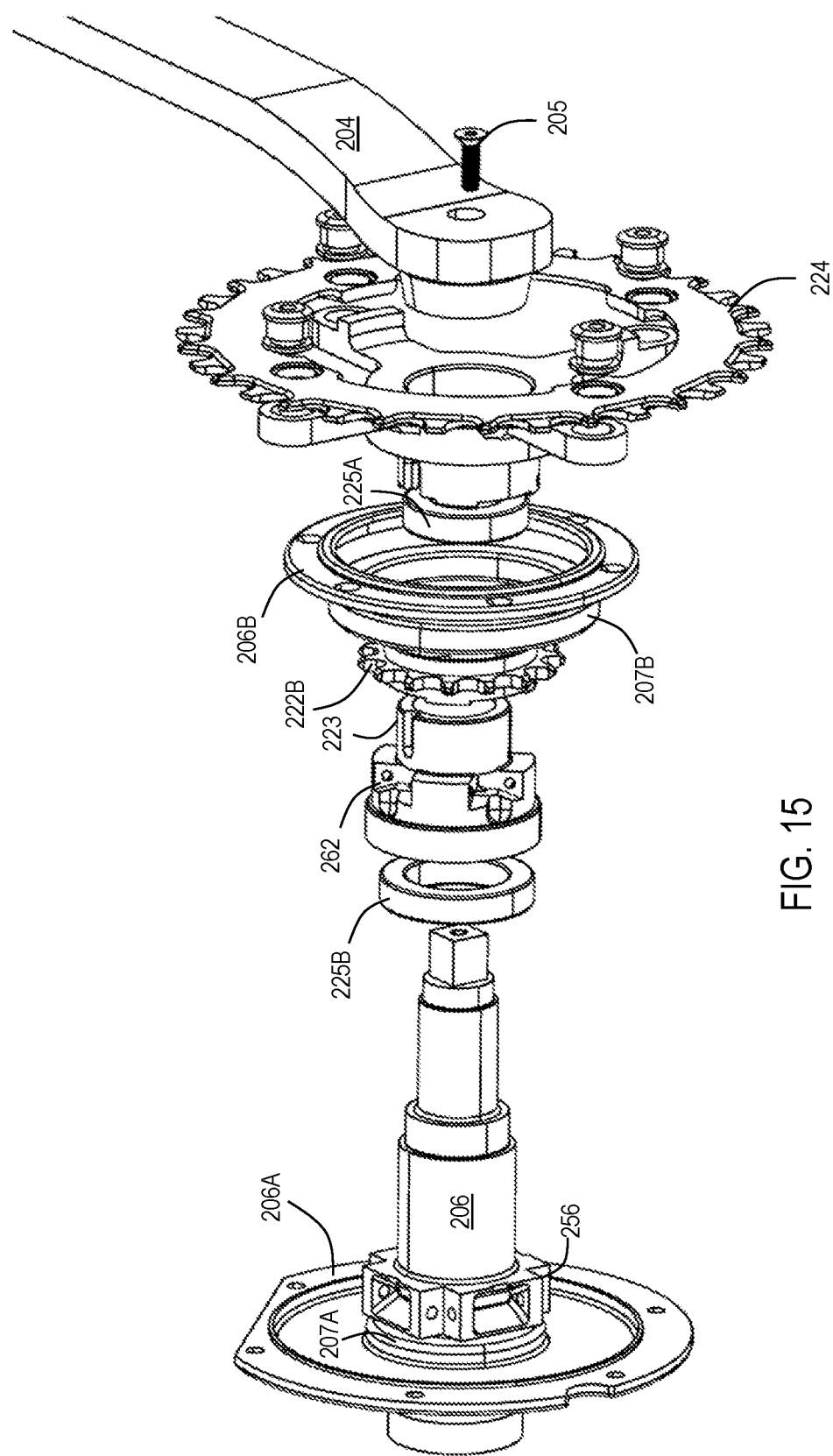
FIG. 15 is an exploded view of a portion of the gearbox of FIG. 2.
Figure 16:
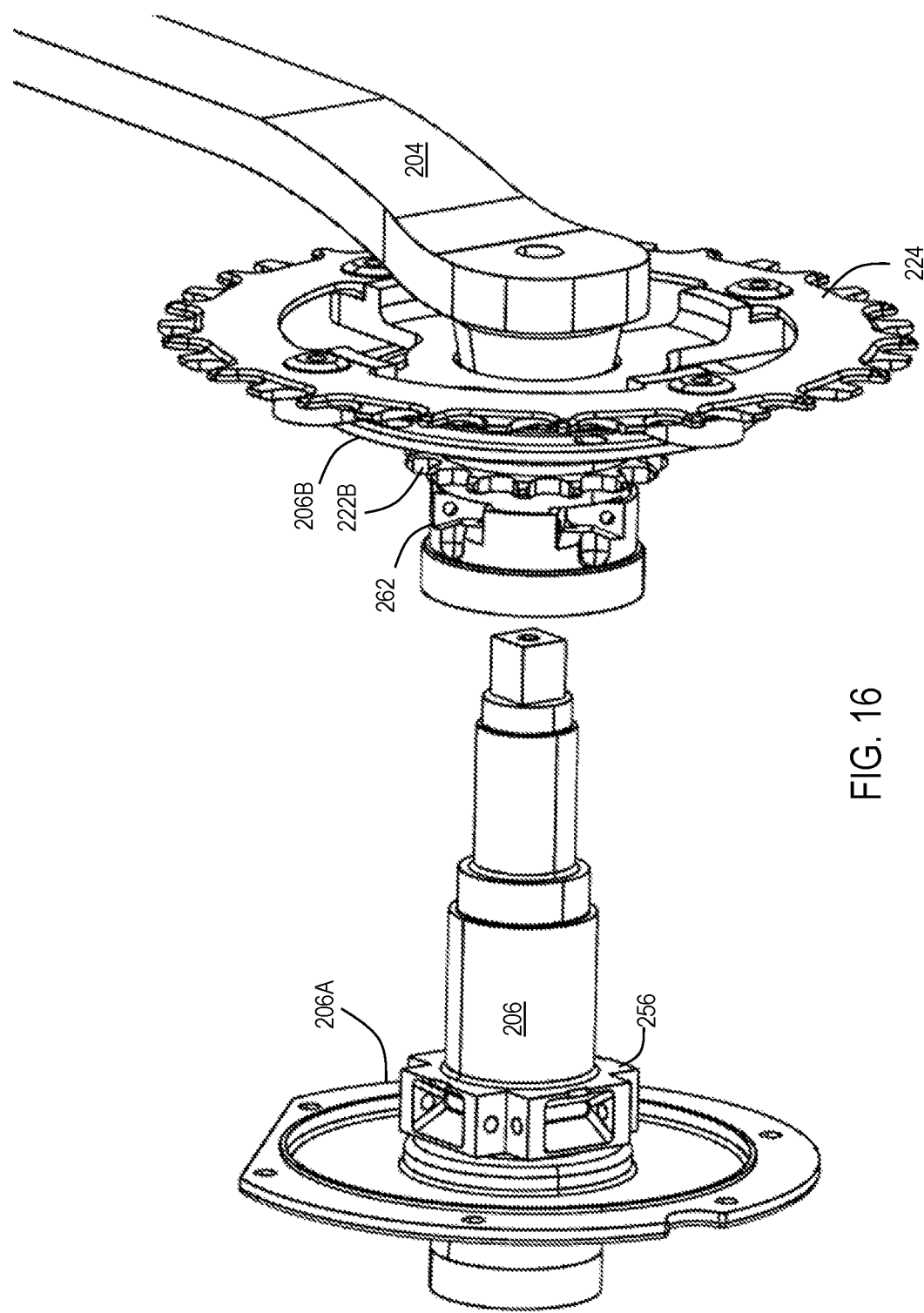
FIG. 16 is a partial exploded view of the portion of FIG. 15.

FIGS. 15 and 16 show an exploded view and partial exploded view, respectively, of spindle 206 and output shaft 223 with various components for attachment thereon.

As shown in FIGS. 17-19, first gear cluster 208 comprises a plurality of segmented gears having different diameters. In the current example, first gear cluster 208 comprises two gears (one inboard and one outboard). In another example, the first gear cluster may comprise more or fewer gears. Gears are arranged within first gear cluster 208 from largest-diameter gear to smallest-diameter gear. Each segment of the segmented gear 208A shares a hinge with a corresponding segment of segmented gear 208B.

Figures 20, 21:
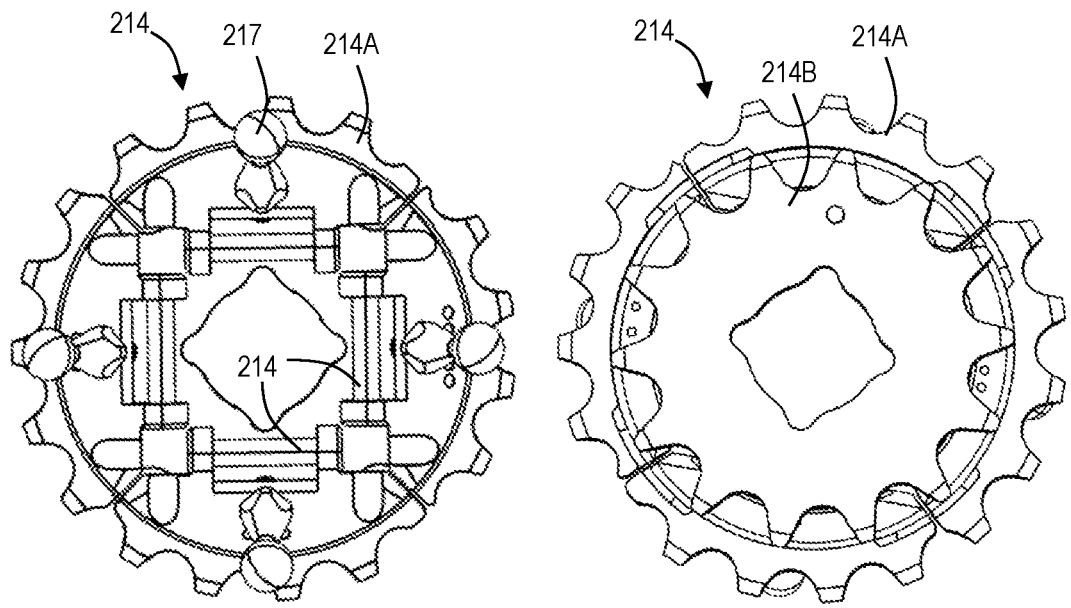
FIG. 20 is a front view of a second gear cluster in accordance with aspects of the present disclosure.
FIG. 21 is a rear view of the gear cluster of FIG. 20.
Figure 22:
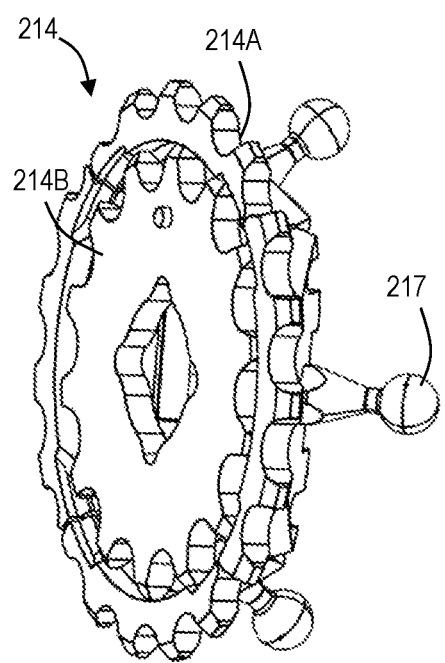
FIG. 22 is an isometric view of the gear cluster of FIG. 20.

As shown in FIGS. 20-22, second gear cluster 214 comprises a sprocket or cog (e.g., a single non-segmented gear) having a first diameter and a segmented gear having a second (larger) diameter, the segmented gear being capable of transitioning into and out of the same plane as the smaller sprocket.

As shown in FIG. 23-25, third gear cluster 218 includes a non-segmented cog or sprocket having a first diameter and a segmented gear having a second (larger) diameter, the segmented gear being capable of transitioning into and out of the same plane as the smaller sprocket.

Figure 28:
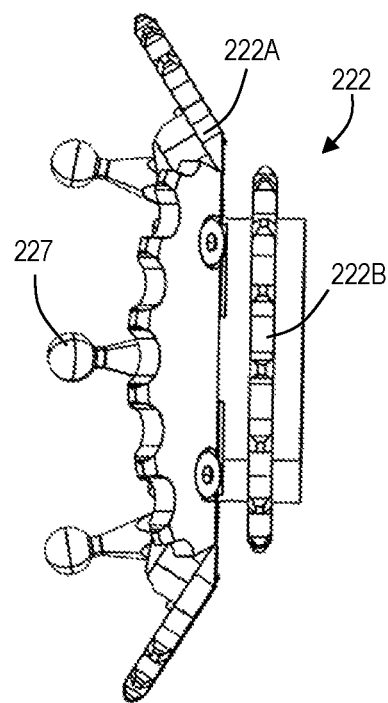
FIG. 28 is an isometric view of the gear cluster of FIG. 26.

As shown in FIG. 26-28, fourth gear cluster 222 comprises a cog having a first diameter and a segmented gear having a second (larger) diameter, the segmented gear being capable of transitioning into and out of the same plane as the smaller sprocket.

Figure 29:
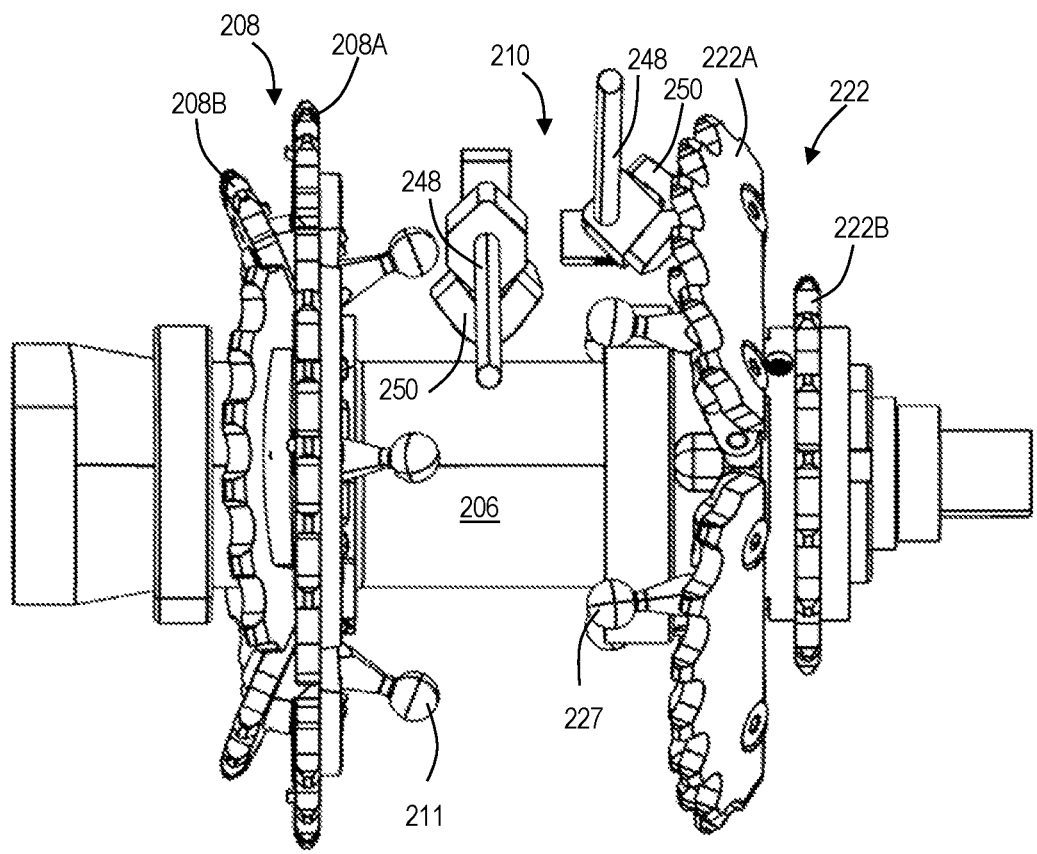
FIG. 29 is a portion of an illustrative shifting system engaged with gear clusters in accordance with aspects of the present disclosure.

FIG. 29 shows the engagement of portions of shifting system 210 with gear clusters 208 and 222. As shown in the figure, the shift wedge corresponding to gear cluster 208 is in its second position and the gear segments of gear 208B are in their pivoted position. Accordingly, the gear segments of gear 208A are in their coplanar position. In contrast, the shift wedge corresponding to gear cluster 222 is in its first position and the gear segments of gear 222A are in their pivoted position.

In the current example, gearbox 200 includes two gear options for first gear cluster 208, corresponding to gears 208A and 208B. These options may be identified as A1 and A2, respectively. In the current example, gearbox 200 includes two gear options for second gear cluster 214, corresponding to gears 214A and 214B. These options may be identified as B1 and B2, respectively. In the current example, gearbox 200 includes two gear options for third gear cluster 218, corresponding to gears 218A and 218B.

These options may be identified as C1 and C2, respectively. In the current example, gearbox 200 includes two gear options for fourth gear cluster 222, corresponding to gears 222A and 222B. These options may be identified as D1 and D2, respectively.

A combination of any one of the gear options of the first gear cluster 208, any one of the gear options of second gear cluster 214, any one of the gear options for third gear cluster 218, and any one of the gear options for fourth gear cluster 222 determines a gear ratio of gearbox 200. Each combination of the available options may be referred to as a "gear" and/or "speed" of the vehicle that includes gearbox 200.

An operator of the vehicle may switch between gear ratios by switching any of the selected options to another available option. For example, if the selected options are presently A1, B1, C2, and D2, the operator may change the present gear ratio by switching D2 to D1. Alternatively, or additionally, the operator may change A1 to A2, and/or may change C2 to C1. Switching gear ratios is typically achieved by actuating a mechanical and/or electronic control to pivot the gear segments of a segmented gear, thereby engaging the chain with a different gear.

C. Second Illustrative Gearbox

Figure 30:
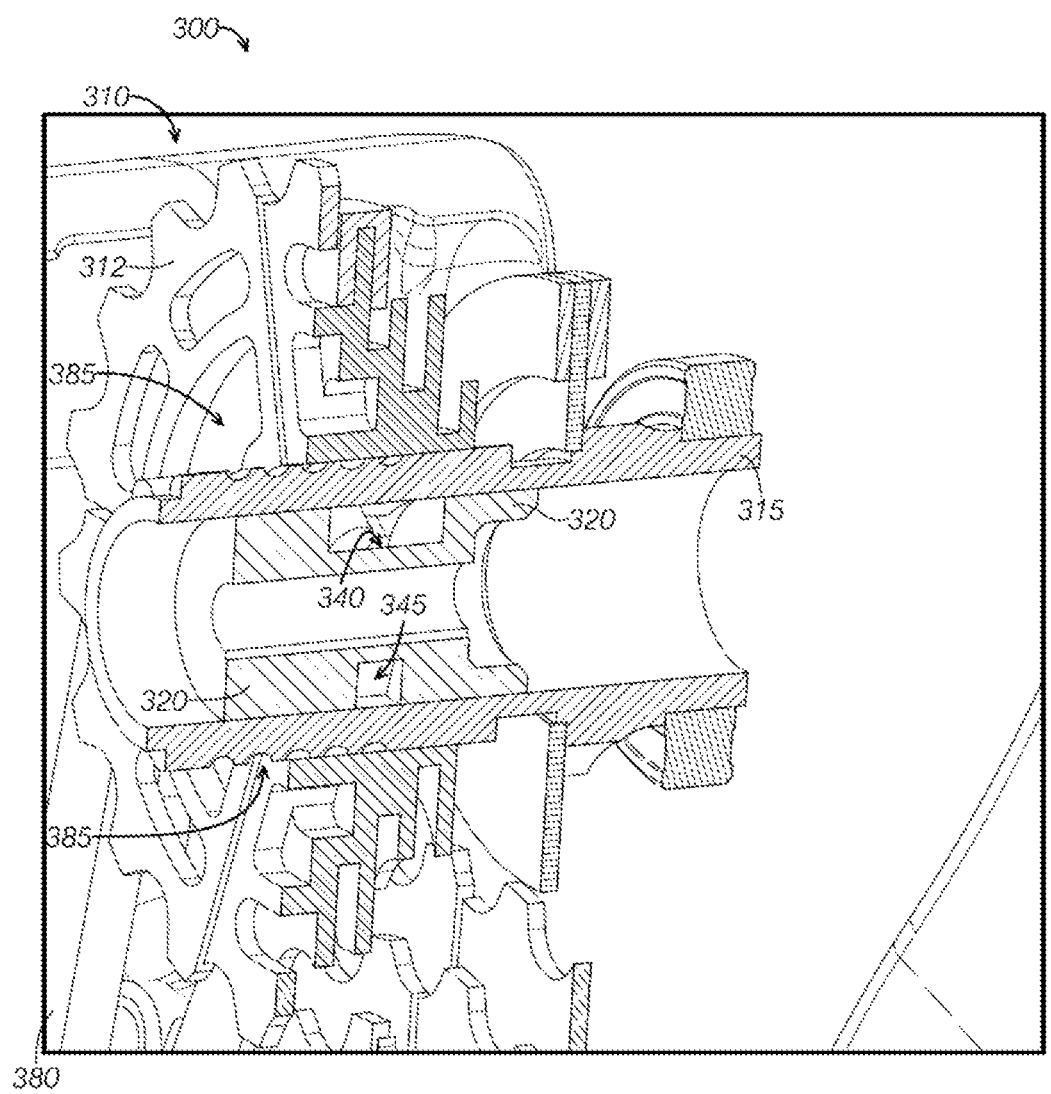
FIG. 30 is a sectional view of an illustrative shifting system in accordance with aspects of the present disclosure.
Figure 31:
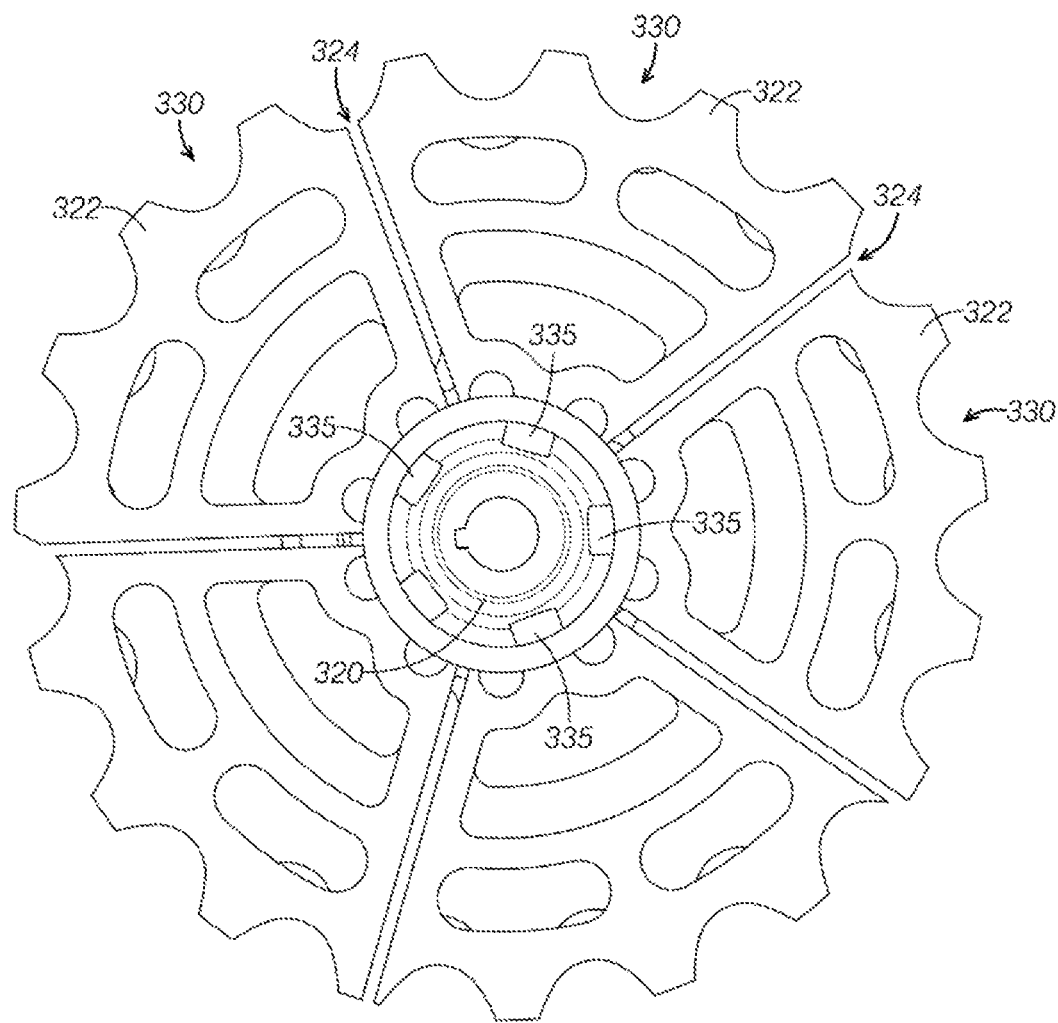
FIG. 31 is side view of an illustrative gear cluster of the shifting system of FIG. 30 in accordance with aspects of the present disclosure.
Figure 32:
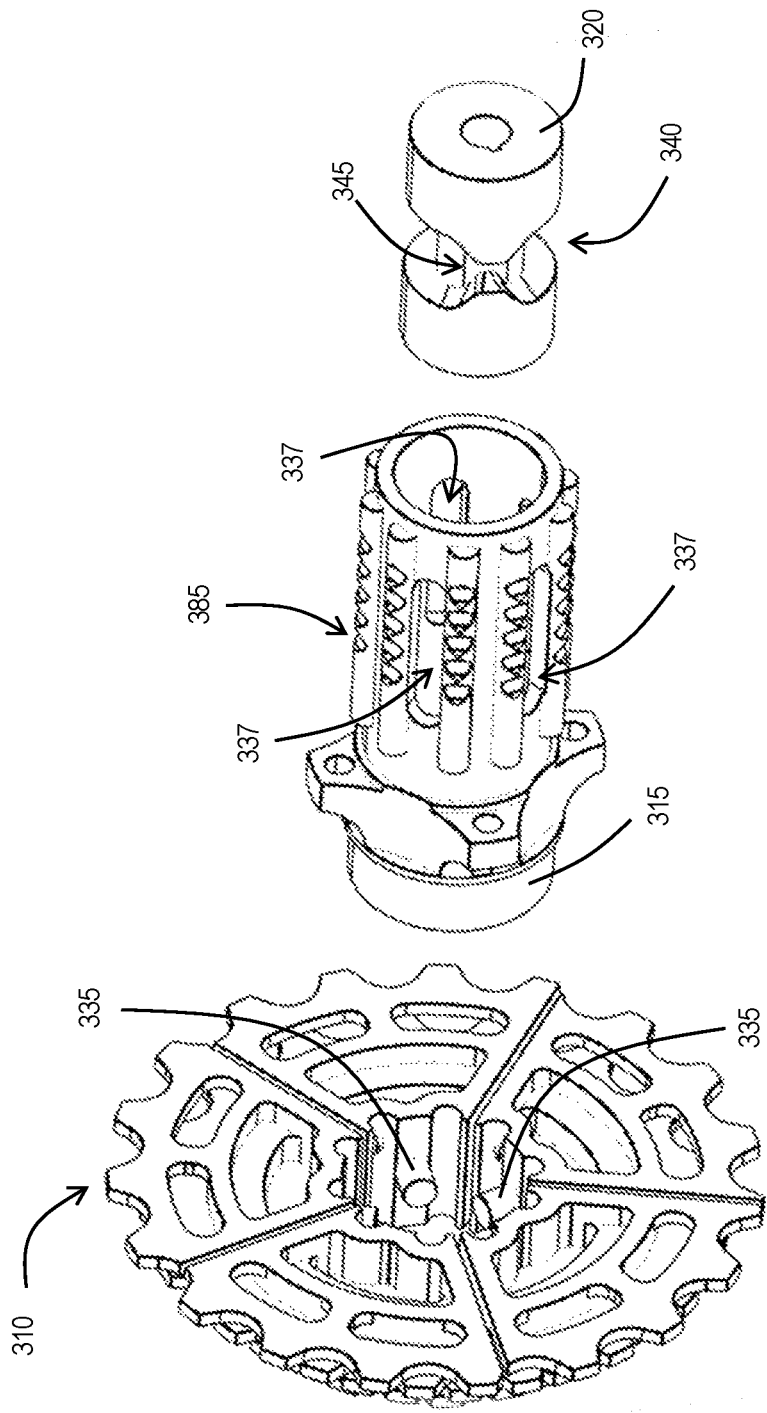
FIG. 32 is an exploded view of the shifting system of FIG. 30.

As shown in FIGS. 30-32, this section describes an illustrative gearbox 300. Gearbox 300 is an example of a system for shifting gear ratios within a gear box by displacing a chain from one sprocket in a cluster to another, without causing the chain to leave its original plane. Aspects of gearbox 300 are suitable for use with the gearbox systems described above, and vice versa.

FIG. 30 depicts an illustrative gear cluster 310 having five gears 312. Gear cluster 310 may be substantially similar in at least some respects to, e.g., gear cluster 208, and/or any other suitable gear cluster described above. Gear cluster 310 is mounted on a shaft 315, which may be substantially similar in at least some respects to layshaft 216, and/or any other suitable axle described above. Shaft 315 rotates along with gear cluster 310.

Gearbox 300 may include any suitable adjustment mechanism for adjusting an axial position of gear cluster 310 and/or segments of the gear cluster. The adjustment mechanism may be disposed within shaft 315 and/or outside of the shaft, and may rotate with the shaft and/or remain stationary relative to the shaft. The adjustment mechanism may be activated electrically, mechanically, hydraulically, and/or in any other suitable manner.

In some examples, the adjustment mechanism comprises at least one actuator (e.g., a linear actuator) disposed outside shaft 315 and configured to rotate with the shaft. For example, the actuator may be mounted to an exterior surface of shaft 315. The actuator is configured to adjust an axial position of gear cluster 310, or one or more segments of the gear cluster. For example, the actuator may be configured to push and/or pull segments of the gear cluster, either directly or through intervening component(s), thereby translating the segment in an axial direction.

In other examples, the adjustment mechanism comprises at least one actuator (e.g., a linear actuator) disposed outside shaft 315 and configured to remain stationary with respect to the frame of the bike, i.e., not to rotate with the shaft. As an example, the actuator may be fixed to a stationary part of the gearbox, such as the housing. In another example, the actuator may be disposed on a bearing positioned at least partially around shaft 315. In this configuration, shaft 315 is allowed to rotate within the bearing, and the actuator remains fixed with respect to the bearing and therefore does not rotate. The actuator may be configured to push or otherwise move gear cluster 310, or segments thereof, in an appropriate direction, e.g., as the gear cluster rotates past the actuator. The actuator may contact gear cluster 310 directly and/or through intervening component.

In some examples, the adjustment mechanism comprises at least one actuator (e.g., a linear actuator) disposed at least partially within shaft 315. The actuator may either be configured to rotate with shaft 315, or not to rotate with the shaft. FIGS. 30-32 and associated description are related to an example wherein an actuator disposed within shaft 315 adjusts a position of segments of gear cluster 310 by translating a shift drum 320 disposed within the shaft.

As shown in FIG. 30, shift drum 320 is disposed within shaft 315 and configured to remain stationary while the shaft and gear cluster 310 rotate. In other words, shift drum 320 does not rotate with shaft 315. This may be accomplished, for example, by using a keyed connection between shift drum 320 and an actuating device 321 (see FIG. 32). Actuating device 321 may comprise any device suitable for translating shift drum 320 within shaft 315, such as a linear actuator. Actuating device 321 may be fastened to a stationary (e.g., non-rotating) part of the gearbox, such as the housing.

FIG. 31 is a side view depicting gear cluster 310 mounted on shaft 315, with shift drum 320 depicted semitransparent within the shaft. The largest gear 312 is depicted in front of smaller gears 312, with the smaller gears visible through openings in the largest gear. As FIG. 31 shows, each gear 312 of gear cluster 310 comprises a plurality of segments 322. Each segment 322 is shaped substantially as an annular sector and/or as a pie slice. Adjacent segments 322 are spaced from each other by small gaps 324. Gaps 324 of each gear 312 are aligned with corresponding gaps within the other gears of gear cluster 310, such that each segment 322 of each gear is aligned with corresponding segments of the other gears. Each set of aligned segments 322 is fused together across gears to form a rigid segment block 330. Each segment block 330 includes a guide pin 335 extending from an inner edge of the segment block through a slot 337 in shaft 315 (see FIG. 32).

FIG. 32 is an exploded isometric view depicting shift drum 320, shaft 315, and gear cluster 310. In the example depicted in FIGS. 30-32, shift drum 320 has a substantially cylindrical shape with a hollow channel extending longitudinally through a center of the shift drum, and a circumferential recess 340 extending circumferentially around a central portion of the shift drum. Circumferential recess 340 has a narrow portion 345 having a narrower width than the rest of the recess. Narrow portion 345 has a width substantially similar to a width of each guide pin 335, such that when the guide pin is positioned within the narrow portion, the axial position of the guide pin relative to shift drum 320 is fixed. Accordingly, gear cluster 310 rotates around shift drum 320 at an axial position corresponding to the position of narrow portion 345. Moving shift drum 320 axially within shaft 315 adjusts the position of narrow portion 345 relative to the shaft, and thus adjusts the axial position of segment blocks 330, i.e., causing the segment block to translate in an axial direction. Adjustment of the axial position of segment blocks 330 enables the shifting of a chain 380 (see FIG. 30) from one gear 312 to another, substantially without changing the axial position of the chain. Each segment block 330 shifts, e.g., sequentially, into a position suitable for accepting chain 380 (e.g., under the chain) as the respective guide pin 335 passes through narrow portion 345. Shaft 315 is typically indexed (e.g., by circumferential indexing grooves 385) to define a plurality of positions of gear cluster 310. Typically, with gear cluster 310 positioned at each position defined by indexing grooves 385, a corresponding one of gears 312 is configured to carry chain 380. Accordingly, shifting gears using gearbox 300 includes adjusting a position of shift drum 320 within shaft 315, thereby moving each segment block 330 such that the selected gear 312 is in a position suitable for accepting chain 380. In some examples, each segment block 330 is moved at a time when the segment block is not engaged with chain 380. In other words, segment blocks 330 may not be typically moved under load.

D. Illustrative Belt-Driven Gearing System

This section describes a belt-driven gearing system 400 for use with gearboxes of the present disclosure. See FIGS. 33-46.

The components and configurations described in this section may be utilized in gearboxes such as gearbox 200, described above, as substitutions and/or additions to the components and configurations already described with respect to gearbox 200. The components described in this section may be utilized in gearbox 200, e.g., as a replacement for the corresponding components described above. For example, one or more of the belt-driven gear clusters described in this section may be utilized in gearbox 200 in place of the corresponding gear clusters described above (i.e., gear clusters 208, 214, 218, and/or 222).

With continuing reference to FIGS. 33-46, belt driven gearing system 400 includes: a first gear cluster 408 configured to be disposed on spindle 206, a second gear cluster 414 configured to be disposed on layshaft 216, a third gear cluster 418 configured to be disposed on layshaft 216, and a fourth gear cluster 422 configured to be disposed on output shaft 223. First gear cluster 408 is coupled to second gear cluster 414 by a first belt 412. Similarly, third gear cluster 418 is coupled to fourth gear cluster 422 by a second belt 420.

Accordingly, rotation of spindle 206 (e.g., by a bicycle rider operating pedals attached to the crankarms and/or by a motor) transmits power from first gear cluster 408 via first belt 412 to second gear cluster 414, and from the second gear cluster via the layshaft to third gear cluster 418. Second belt 420 transmits power from third gear cluster 418 to fourth gear cluster 422, and power is transmitted from the fourth gear cluster via output shaft 223 to chainring 224, and/or to another suitable system.

Figure 33:
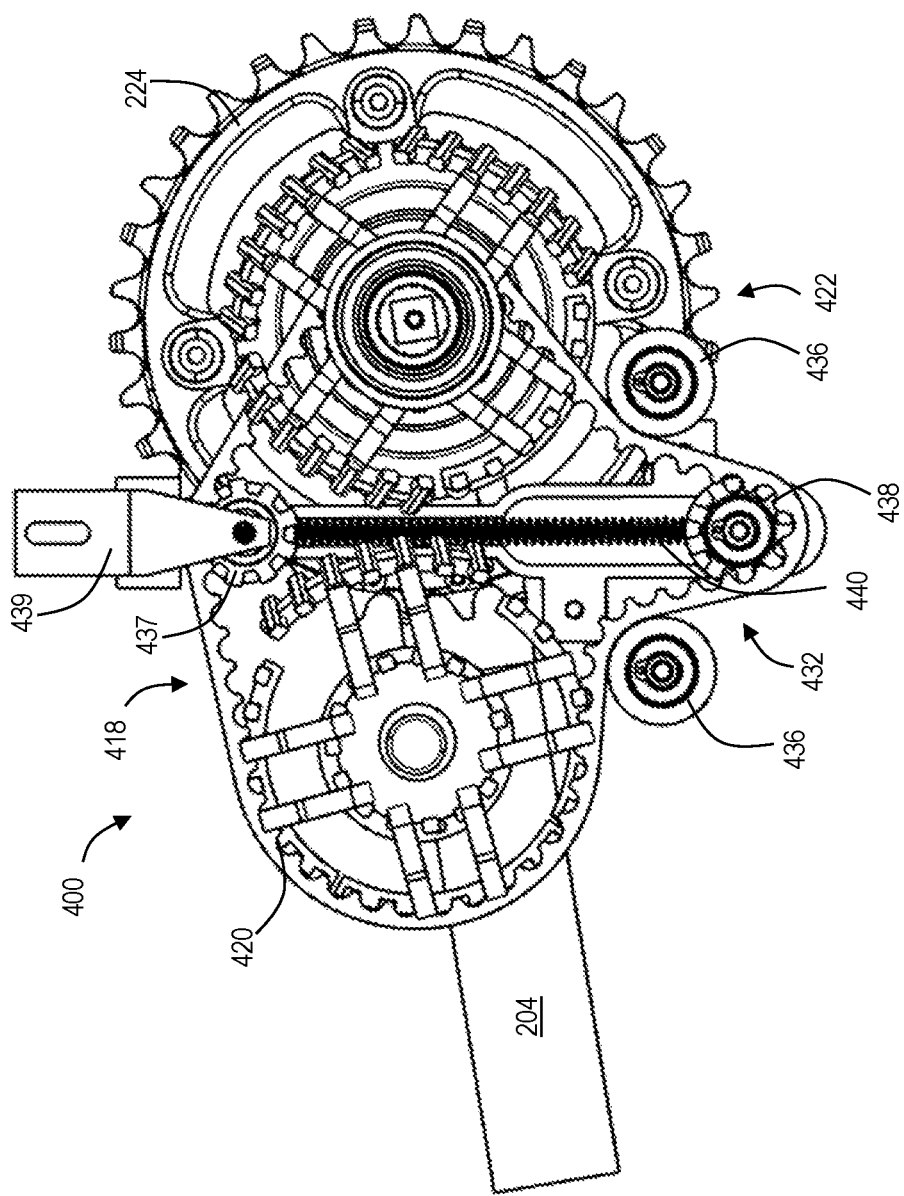
FIG. 33 is a sectional view of a belt driven gearing system in accordance with aspects of the present disclosure.
Figure 34:
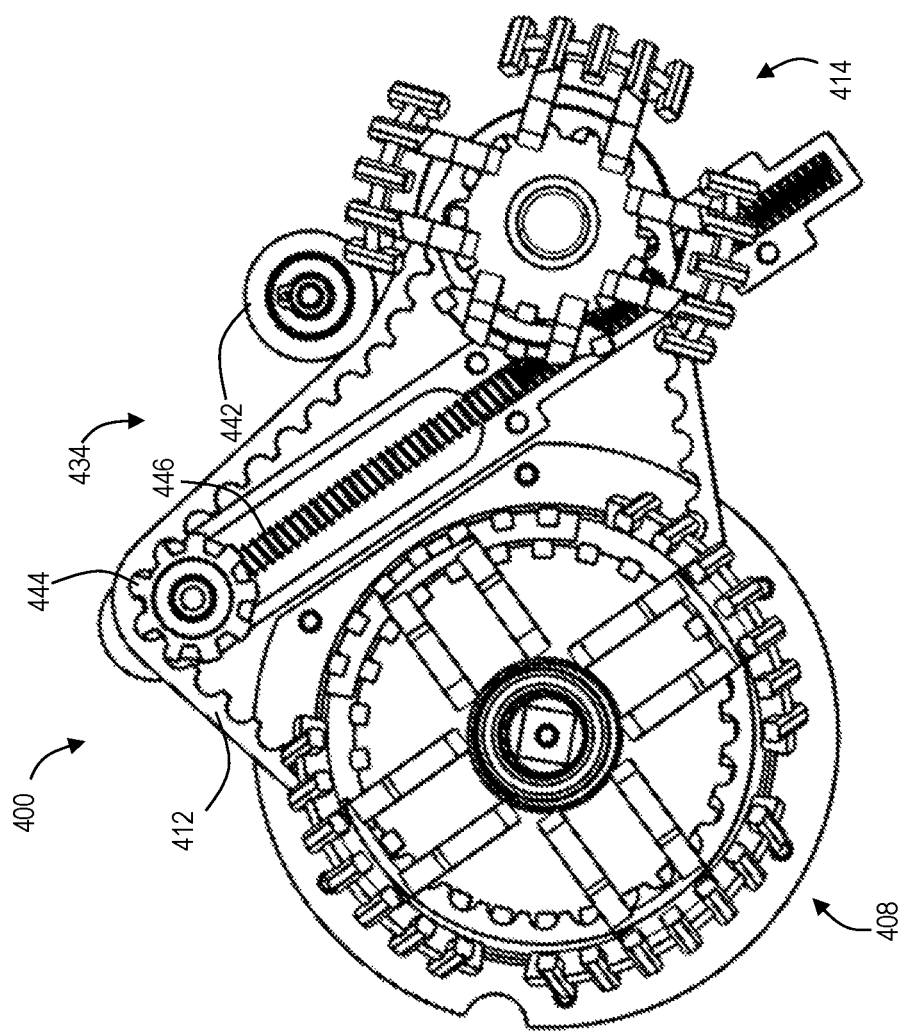
FIG. 34 is a sectional view of the belt driven gearing system of FIG. 33.

In the example shown in FIGS. 33 and 34, first and second belts 412, 420 are toothed belts (AKA timing belts), although other ridged or castellated belts may be utilized, for example cogged belts. In this example, each belt has a toothed surface and a non-toothed surface. In some examples, friction belts are utilized, e.g., flat belts, V-belts, ribbed belts (i.e., poly-V belts), hexagonal belts, etc., with gears of the system having a corresponding profile to engage the selected belt. As each type of belt provides a different response with respect to maximum torque, slippage, etc., suitable belts may be selected based on the expected application and load.

In the example shown in FIGS. 33-46, gear clusters 408, 414, 418, 422 are configured to engage the timing belts. In other words, the gear clusters include a plurality of complimentary castellations configured to engage the toothed surfaces of belts 412, 420. In some examples, the gear clusters are adapted to engage a friction belt, e.g., by having a profile or contour complimentary to that of the friction belt.

Each of the gear clusters may include a plurality of gears, one or more of which have a plurality of gear segments. Gears that have gear segments may be referred to as segmented gears. Each gear segment may be shaped as an annular sector. In some examples, each segmented gear comprises four gear segments. Each gear segment is rotatably attached to a hinge disposed near the center of the segmented gear. One or more gear clusters may have a non-segmented sprocket having a smaller diameter than the respective segmented gear. Each gear segment may be attached to a shifting pin. Each gear segment pivots (or folds) in a direction transverse to the plane of the gear. In other words, each such gear segment is transitionable between a coplanar position and a pivoted (AKA folded) position. This configuration enables a segmented gear to transition (e.g., stepwise) between a coplanar configuration (i.e., with all segments aligned to form a substantially coplanar gear) and a pivoted (AKA pyramidal) configuration (i.e., with all gear segments rotationally skewed in the same direction away from the plane formed in the coplanar configuration)

The shifting of gear clusters 408, 414, 418, and 422 is substantially similar to the shifting of gear clusters 208, 214, 218, and 222, e.g., utilizing shifting system 210 as described above.

As shown in FIG. 33, third gear cluster 418 is configured to engage second belt 420. Second belt 420 couples a selected one of the gears to fourth gear cluster 422, thereby transmitting rotation of third gear cluster 418 to fourth gear cluster 422. Typically, second belt 420 directly engages a single one of the gears of third gear cluster 418 and fourth gear cluster 422 at any given time; however, the belt may engage more than one of the gears of the clusters at some stages of operation, such as when the belt is being shifted from one gear to another (e.g., in response to user and/or controller input). Fourth gear cluster 422 may be securely mounted on output shaft 223 (see above) such that the output shaft rotates with the fourth gear cluster.

As shown in FIG. 33, gearing system 400 includes a first belt tensioner 432. First belt tensioner 432 includes at least one idler 436 having a fixed location, at least one stationary gear 437 attached to a mounting bracket 439, and at least one adjustable gear 438 configured to be moved or translated by a pushrod 440. In the example shown in FIG. 33, first belt tensioner 432 includes two idlers. Idlers 436 have a smooth outer surface configured to engage the smooth, non-toothed side or surface of belt 420. Conversely, stationary gear 437 and adjustable gear 438 have castellations configured to engage the toothed surface of belt 420. A spring is coaxially mounted to pushrod 440 to provide a biasing force.

First belt tensioner 432 may be configured to engage any of the belts described above. In the current example, idler 436 and gears 437, 438 of first belt tensioner 432 are configured to engage belt 420. Accordingly, belt 420 interfaces with third gear cluster 418, fourth gear cluster 422, and belt tensioner 432.

First belt tensioner 432 is configured such that pushrod 440 can be utilized to linearly displace gears 438 with respect to gear 437, thereby applying more or less tension to the engaged belt. Manipulation of pushrod 440 may be manual (e.g., by a user), and/or may be automatic (e.g., using mechanical and/or electric components).

As shown in FIG. 34, first gear cluster 408 is coupled to second gear cluster 414 by first belt 412. The system is configured such that first belt 412 directly engages a single one of the gears of first gear cluster 408 and second gear cluster 414 at any given time; however, the belt may partially engage more than one of the gears of each cluster at some stages of operation, such as when the belt is being segmentally shifted from one gear to another (e.g., in response to user and/or controller input). Second gear cluster 414 is securely mounted on layshaft 216 (see above) such that rotation of second gear cluster 414 also rotates the layshaft.

Additionally, as shown in FIG. 34, gearing system 400 includes a second belt tensioner 434. Second belt tensioner 434 is configured to engage first belt 412. Accordingly, belt 412 is configured to interface with first gear cluster 408, second gear cluster 414, and belt tensioner 434.

In the example shown in FIG. 34, belt tensioner 434 includes a single idler 442 and an adjustable gear 444 attached to a pushrod 446. Idler 442 has a smooth outer surface configured to engage the non-toothed surfaced of belt 412. Conversely, adjustable gear 438 includes castellations configured to engage the toothed surface of belt 412. A spring is coaxially mounted to pushrod 440 to provide a biasing force.

Second belt tensioner 434 is configured such that pushrod 446 can be utilized to displace gear 444, thereby applying more or less tension to the engaged belt. Manipulation of pushrod 446 may be manual (e.g., by a user), and/or may be automatic (e.g., using mechanical and/or electric components).

Figure 35:
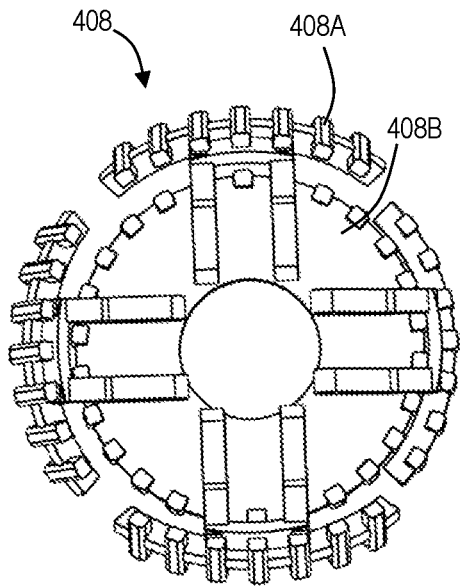
FIG. 35 is a front view of a first belt-driven gear cluster of the gearing system of FIG. 33.
Figure 36:
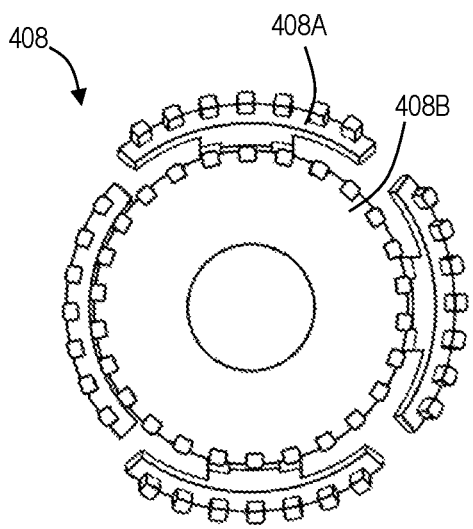
FIG. 36 is a rear view of the gear cluster of FIG. 35.
Figure 37:
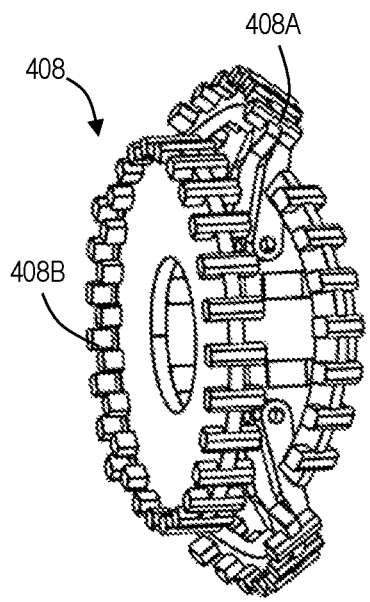
FIG. 37 is an isometric view of the gear cluster of FIG. 35.

As shown in FIGS. 35-37, first gear cluster 408 comprises a sprocket or cog 408B (e.g., a single non-segmented gear) having a first diameter and a segmented gear 408A having a second (larger) diameter. The segmented gear is capable of transitioning into and out of the same plane as the smaller sprocket. In the current example, first gear cluster 408 comprises two gears. In another example, the first gear cluster may comprise more or fewer gears. Gears are arranged within first gear cluster 408 from largest-diameter gear to smallest-diameter gear.

Each gear segment of segmented gear 408A includes a pin (e.g., pin 211) affixed in the same corresponding location as segmented gear 208A, described above. Additionally, each gear segment of segmented gear 408A is configured to include a hinge portion (e.g., hinge portion 209) in the same corresponding location as segmented gear 208A. The hinge portion is configured to mate with hinge receiver 256 disposed on spindle 206.

Figure 38:
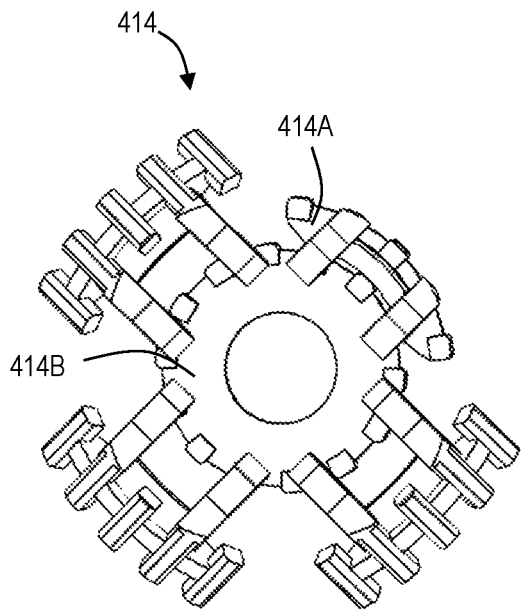
FIG. 38 is a front view of a second belt-driven gear cluster of the gearing system of FIG. 33.
Figure 39:
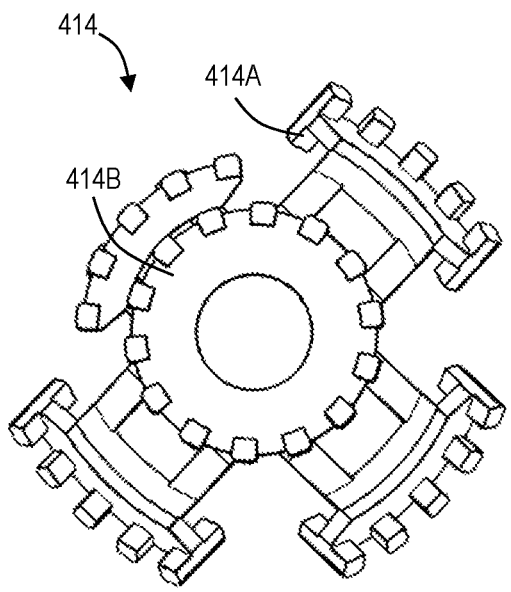
FIG. 39 is a rear view of the gear cluster of FIG. 38.
Figure 40:
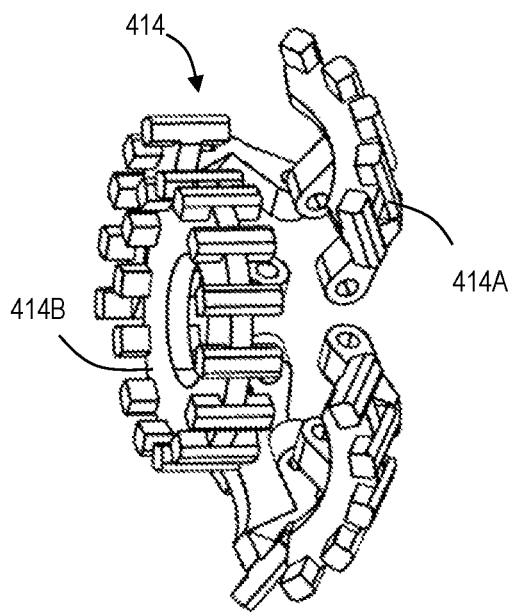
FIG. 40 is an isometric view of the gear cluster of FIG. 38.

As shown in FIGS. 38-40, second gear cluster 414 has a nested arrangement, such that a segmented gear 414A and a non-segmented sprocket 414B are nestable together. The segmented gear being capable of transitioning into and out of the same plane as the smaller sprocket. In the depicted example, second gear cluster 414 comprises two gears. In another example, the second gear cluster may comprise more or fewer gears. Gears are arranged within second gear cluster 414 from largest-diameter gear to smallest-diameter gear.

The inboard face of each gear segment of segmented gear 414A is configured to include a pin (e.g., pin 217) affixed in the same corresponding location as segmented gear 214A. Additionally, each gear segment of segmented gear 414A is configured to include a hinge portion (e.g., hinge portion 215) in the same corresponding location as segmented gear 214A. The hinge portion is configured to mate with hinge receiver 258 disposed on layshaft 216.

Figure 41:
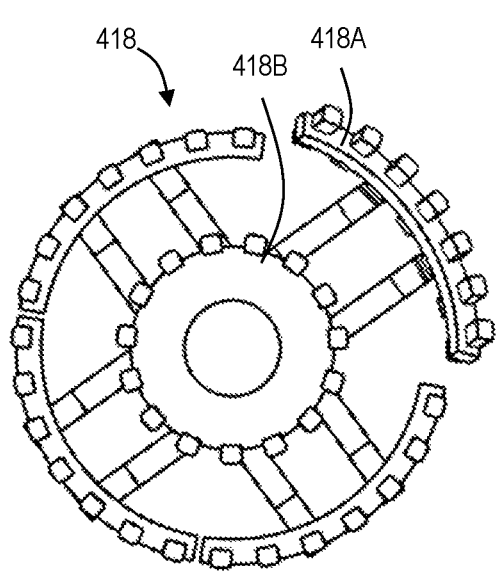
FIG. 41 is a front view of a third belt-driven gear cluster of the gearing system of FIG. 33.
Figure 42:
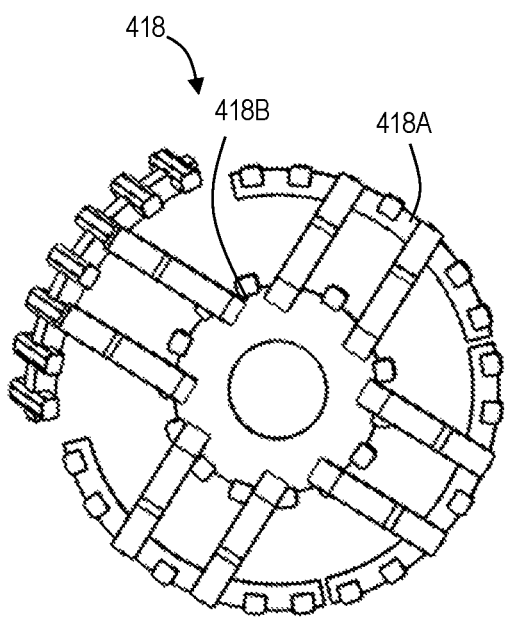
FIG. 42 is a rear view of the gear cluster of FIG. 41.
Figure 43:
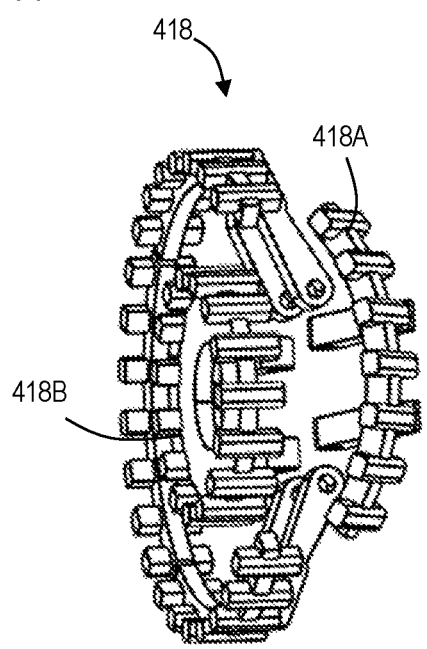
FIG. 43 is an isometric view of the gear cluster of FIG. 41.

As shown in FIGS. 41-43, third gear cluster 418 has a nested arrangement, such that a segmented gear 418A and a non-segmented sprocket 418B are nestable together. The segmented gear being capable of transitioning into and out of the same plane as the smaller sprocket. In the current example, third gear cluster 418 comprises two gears. In another example, the third gear cluster may comprise more or fewer gears. Gears are arranged within third gear cluster 418 from largest-diameter gear to smallest-diameter gear.

The inboard face of each gear segment of segmented gear 418A includes a pin (e.g., pin 226) affixed in the same corresponding location as segmented gear 218A. Additionally, each gear segment of segmented gear 418A is configured to include a hinge portion (e.g., hinge portion 219) in the same corresponding location as segmented gear 218A. The hinge portion is configured to be coupled to hinge receiver 260 disposed on layshaft 216.

Figure 44:
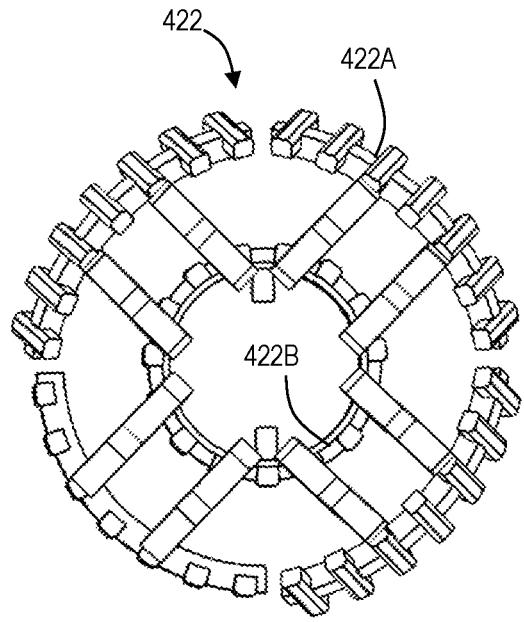
FIG. 44 is a front view of a fourth belt-driven gear cluster of the gearing system of FIG. 33.
Figure 45:
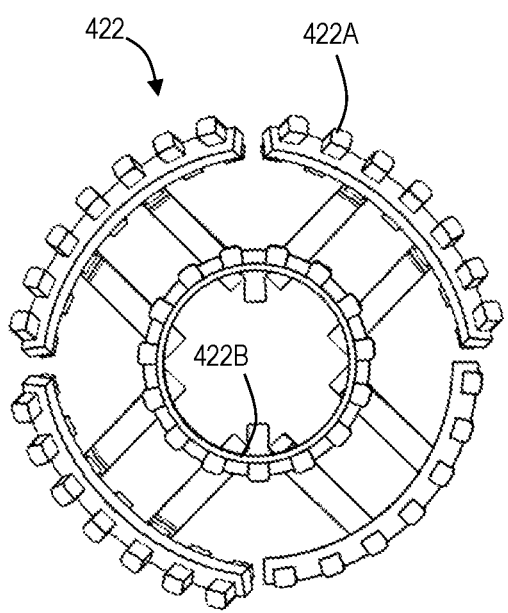
FIG. 45 is a rear view of the gear cluster of FIG. 44.
Figure 46:
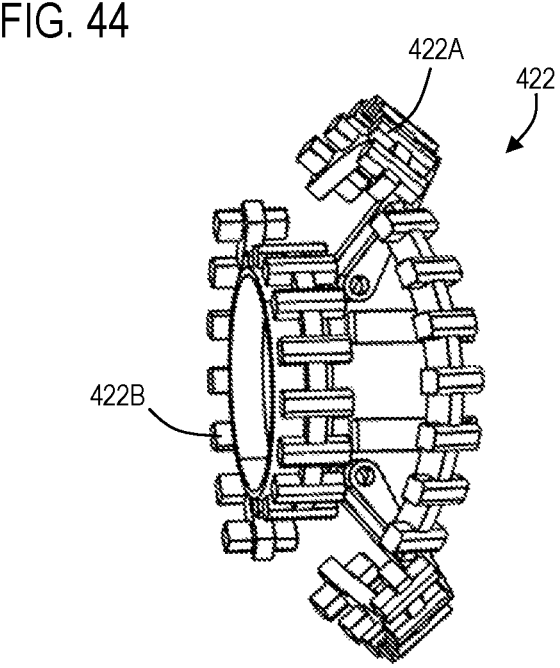
FIG. 46 is an isometric view of the gear cluster of FIG. 44.

As shown in FIGS. 44-46, fourth gear cluster 422 has a nested arrangement, such that a segmented gear 422A and a non-segmented sprocket 422B are nestable together. The segmented gear being capable of transitioning into and out of the same plane as the smaller sprocket. In the current example, fourth gear cluster 422 comprises two gears. In another example, the fourth gear cluster may comprise more or fewer gears. Gears are arranged within third gear cluster 418 from largest-diameter gear to smallest-diameter gear.

The inboard face of each gear segment of segmented gear 422A has a pin (e.g., pin 227) affixed in the same corresponding location as segmented gear 222A. Sprocket 422B includes an opening for mating with output shaft 223. Each gear segment of segmented gear 422A is configured to include a hinge portion (e.g., hinge portion 221). The hinge portion is configured to mate with hinge receiver 262 disposed on layshaft 216.

In the depicted example, gearing system 400 includes two gear options for first gear cluster 408, corresponding to gears 408A and 408B. These options are identified as A1 and A2, respectively. In the current example, gearbox 400 includes two gear options for second gear cluster 414, corresponding to gears 414A and 414B. These options are identified as B1 and B2, respectively. In the current example, gearbox 400 includes two gear options for third gear cluster 418, corresponding to gears 418A and 418B. These options are identified as C1 and C2, respectively. In the current example, gearbox 400 includes two gear options for fourth gear cluster 422, corresponding to gears 422A and 422B. These options are identified as D1 and D2, respectively.

A combination of any one of the gear options of the first gear cluster 408, any one of the gear options of second gear cluster 414, any one of the gear options for third gear cluster 418, and any one of the gear options for fourth gear cluster 422 determines a gear ratio of gearing system 400. Each combination of the available options may be referred to as a "gear" and/or "speed" of the vehicle that includes gearbox 400.

An operator of the vehicle may switch between gear ratios by switching any of the selected options to another available option. For example, if the selected options are presently A1, B1, C2, and D2, the operator may change the present gear ratio by switching D2 to D1. Alternatively, or additionally, the operator may change A1 to A2, and/or may change C2 to C1. Switching gear ratios is typically achieved by actuating a mechanical and/or electronic control to pivot the gear segments of a segmented gear, thereby engaging the belt with a different gear.

D. Illustrative Combinations and Additional Examples

This section describes additional aspects and features of gearboxes as outlined in Sections A through C, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A gearbox for a vehicle, the gearbox comprising:
a drive spindle;
a first gear cluster coaxially fastened to the spindle such that the first gear cluster rotates with the spindle, wherein an inboard gear of the first gear cluster includes a plurality of pivotable inboard segments, each of which has a respective pin protruding transversely from an inboard face;
a second gear cluster having one or more gears coaxially fastened to a layshaft spaced from and parallel to the spindle, such that the layshaft rotates with the second gear cluster;
a continuous first belt coupling the first gear cluster to the second gear cluster, such that the first gear cluster drives the second gear cluster and the first belt defines a first plane, wherein the segments of the inboard gear of the first gear cluster are each pivotable into and out of the first plane;
a third gear cluster having one or more gears coaxially fastened to the layshaft and spaced from the second gear cluster, such that the third gear cluster rotates with the layshaft;
a fourth gear cluster having one or more gears coupled to a sleeve coaxially mounted over the spindle such that the sleeve rotates independently of the spindle;
a continuous second belt coupling the third gear cluster to the second gear cluster, such that the third gear cluster drives the fourth gear cluster and the second belt defines a second plane parallel to the first plane;
a chainring fastened to the sleeve, such that the chainring rotates with the fourth gear cluster; and
a shifting system including a first shifting wedge transitionable between:
(a) a first configuration, in which a first ramped face of the wedge is in line with the pin of each segment of the inboard gear of the first gear cluster when the segment is out of the first plane, such that rotating the pin into the first ramped face is configured to urge the segment into the first plane, and
(b) a second configuration, in which a second ramped face of the wedge is in line with the pin of each segment of the inboard gear of the first gear cluster when the segment is in the first plane such that rotating the pins into the second ramped face is configured to urge the segment out of the first plane.

A1. The gearbox of A0, wherein the first gear cluster, second gear cluster, first belt, third gear cluster, fourth gear cluster, and second belt are enclosed in a housing.

A2. The gearbox of A0 or A1, wherein an outboard gear of the first gear cluster is nested within the inboard gear, such that the outboard gear is in line with the first plane.

A3. The gearbox of A2, wherein the outboard gear is a non-segmented gear.

A4. The gearbox of A0 or A1, wherein an outboard gear of the first gear cluster includes a plurality of pivotable outboard segments arranged in pairs with the inboard segments, each pair of outboard and inboard segments being mounted to a common hinge, such that pivoting the inboard segment of the pair out of the first plane automatically pivots the outboard segment of the pair into the first plane.

A5. The gearbox of any one of paragraphs A0 through A4, wherein the drive spindle is coupled to a crankset configured to rotate the spindle.

A6. The gearbox of any one of paragraphs A0 through A5, wherein the drive spindle is coupled to an electric motor configured to rotate the spindle.

A7. The gearbox of any one of paragraphs A0 through A6, wherein an inboard gear of the second gear cluster includes a plurality of pivotable segments, each of which has a respective pin protruding transversely from an inboard face.

A8. The gearbox of A7, the shifting system further comprising a second shifting wedge configured to pivot the segments of the inboard gear of the second gear cluster.

A9. The gearbox of any one of paragraphs A0 through A8, wherein a respective inboard gear of each of the third and fourth gear clusters includes a plurality of pivotable segments, each of which has a respective pin protruding transversely from an inboard face.

B0. A gearbox for a vehicle, the gearbox comprising:
a drive spindle;
a first gear cluster coaxially fastened to the spindle such that the first gear cluster rotates with the spindle, the first gear cluster including an outboard gear and an inboard gear, wherein the inboard gear is physically divided into a plurality of segments;
a second gear cluster having one or more gears coaxially fastened to a layshaft spaced from and parallel to the spindle, such that the layshaft rotates with the second gear cluster;
a continuous first belt coupling the first gear cluster to the second gear cluster, such that the first gear cluster drives the second gear cluster and the first belt defines a first plane, wherein the segments of the inboard gear of the first gear cluster are each movable into and out of the first plane;
a third gear cluster having one or more gears coaxially fastened to the layshaft and spaced from the second gear cluster, such that the third gear cluster rotates with the layshaft;
a fourth gear cluster having one or more gears coupled to a sleeve coaxially mounted over the spindle such that the sleeve rotates independently of the spindle;
a continuous second belt coupling the third gear cluster to the second gear cluster, such that the third gear cluster drives the fourth gear cluster;
a chainring fastened to the sleeve, such that the chainring rotates with the fourth gear cluster; and
a shifting system including an actuator configured to urge the segments of the inboard gear of the first gear cluster into and out of the first plane, such that a gear ratio of the gearbox is changeable without displacing the first belt out of the first plane.

B1. The gearbox of B0, wherein the segments of the inboard gear of the first gear cluster are configured to translate into and out of the first plane along the spindle.

B2. The gearbox of B0, wherein the segments of the inboard gear of the first gear cluster are configured to pivot into and out of the first plane.

B3. The gearbox of B2, wherein the outboard gear of the first gear cluster includes a plurality of pivotable outboard segments arranged in pairs with the inboard segments, each pair of outboard and inboard segments being mounted to a common hinge, such that pivoting the inboard segment of the pair out of the first plane automatically pivots the outboard segment of the pair into the first plane.

B4. The gearbox of B2, wherein each of the segments of the inboard gear has a respective pin protruding transversely from an inboard face; and the actuator of the shifting system includes a shifting wedge transitionable between:
(a) a first configuration, in which a first ramped face of the wedge is in line with the pin of each segment of the inboard gear of the first gear cluster when the segment is out of the first plane, such that rotating the pin into the first ramped face is configured to urge the segment into the first plane, and
(b) a second configuration, in which a second ramped face of the wedge is in line with the pin of each segment of the inboard gear of the first gear cluster when the segment is in the first plane such that rotating the pins into the second ramped face is configured to urge the segment out of the first plane.

B5. The gearbox of B2, wherein a respective inboard gear of each of the second, third, and/or fourth gear clusters includes a plurality of pivotable segments.

B6. The gearbox of B5, the actuator of the shifting system further comprising a second shifting wedge configured to pivot the segments of the inboard gear of the second gear cluster.

B7. The gearbox of any one of paragraphs B0 through B6, wherein the first gear cluster, second gear cluster, first belt, third gear cluster, fourth gear cluster, and second belt are enclosed in a housing.

B8. The gearbox of any one of paragraphs B0 through B2, wherein an outboard gear of the first gear cluster is nestable with the inboard gear.

B9. The gearbox of B8, wherein the outboard gear is a non-segmented gear.

C0. A gearbox for a vehicle, the gearbox comprising:
a drive spindle;
a layshaft spaced from and parallel to the spindle;
a first gear cluster coaxially fastened to one of the spindle or the layshaft and rotatable therewith, the first gear cluster including an outboard gear and an inboard gear, wherein the inboard gear is physically divided into a plurality of segments;
a second gear cluster coaxially fastened to the other of the spindle or the layshaft and rotatable therewith, the second gear cluster having one or more gears;
a continuous belt coupling the first gear cluster to the second gear cluster, such that the belt defines a plane, wherein the segments of the inboard gear of the first gear cluster are each movable into and out of the first plane;
a chainring coupled to the layshaft, such that the chainring rotates with the layshaft; and
a shifting system including an actuator configured to urge the segments of the inboard gear of the first gear cluster into and out of the plane of the belt, such that a gear ratio of the gearbox is changeable without displacing the belt out of the plane.

C1. The gearbox of C0, wherein the segments of the inboard gear of the first gear cluster are configured to translate axially into and out of the plane of the belt.

C2. The gearbox of C0, wherein the segments of the inboard gear of the first gear cluster are configured to pivot into and out of the plane of the belt.

C3. The gearbox of C2, wherein the outboard gear of the first gear cluster includes a plurality of pivotable outboard segments arranged in pairs with the inboard segments, each pair of outboard and inboard segments being mounted to a common hinge, such that pivoting the inboard segment of the pair out of the plane automatically pivots the outboard segment of the pair into the plane.

C4. The gearbox of C2, wherein each of the segments of the inboard gear has a respective pin protruding transversely from an inboard face; and wherein the actuator of the shifting system includes a shifting wedge transitionable between:
(a) a first configuration, in which a first ramped face of the wedge is in line with the pin of each segment of the inboard gear of the first gear cluster when the segment is out of the plane, such that rotating the pin into the first ramped face is configured to urge the segment into the plane, and
(b) a second configuration, in which a second ramped face of the wedge is in line with the pin of each segment of the inboard gear of the first gear cluster when the segment is in the plane such that rotating the pins into the second ramped face is configured to urge the segment out of the plane.

C5. The gearbox of C2, wherein a respective inboard gear of the second gear cluster includes a plurality of pivotable segments.

C6. The gearbox of C5, the actuator of the shifting system further comprising a second shifting wedge configured to pivot the segments of the inboard gear of the second gear cluster.

C7. The gearbox of any one of paragraphs C0 through C6, wherein the first gear cluster, second gear cluster, and belt are enclosed in a housing.

C8. The gearbox of any one of paragraphs C0 through C2, wherein an outboard gear of the first gear cluster is nestable with the inboard gear.

C9. The gearbox of C8, wherein the outboard gear is a non-segmented gear.

E. Illustrative Method of Shifting a Gearbox

This section describes steps of an illustrative method for shifting a gearbox in accordance with the present disclosure. Aspects of gearboxes and shifting systems described above may be utilized in the method steps described below. Where appropriate, reference may be made to components and systems that may be used in carrying out each step. These references are for illustration, and are not intended to limit the possible ways of carrying out any particular step of the method. This section may not recite the complete process or all steps of the method. Although various steps are described below, the steps need not necessarily all be performed, and in some cases may be performed simultaneously or in a different order.

A first step includes operating a gearbox in a first gear ratio by rotating a drive spindle thereof, the drive spindle having a corotating first gear cluster coupled to a first belt. The first belt is also coupled to a second gear cluster, and the first belt defines a first plane. The first gear ratio is defined by a combination of selected gears of the first and second gear clusters.

A second step includes shifting the gearbox into a second gear ratio by displacing a segmented one of the gears of the first or second gear clusters one segment at a time, such that teeth of the displaced gear move out of the first plane. The segments are each displaced at a rotational position where the segment is disengaged from the belt, such that the belt remains in the first plane and no segment is displaced under load.

In some examples, the gear segments are configured to translate axially (see gearbox 300). In some examples, the gear segments are configured to be displaced in a pivoting fashion (see gearbox 400).

The gearbox may include additional gear clusters. A third step may therefore include shifting the gearbox into additional gear ratios by displacing one or more other segmented gears on any one of the gear clusters.

Shifting between gear ratios may be controlled using a manual actuator and/or using an electronic controller to signal an electromechanical actuator. For example, a shifting actuator may include a motorized pivoting or translating actuator to displace gear segments and/or a motorized rotational actuator configured to change the position of one or more shifting wedges, as described with respect to gearbox 400.

Advantages, Features, and Benefits

The different embodiments and examples of the gearbox and shifting systems described herein provide several advantages over known solutions. For example, illustrative embodiments and examples described herein allow a smaller chance of dropping the external bike belt as compared with known derailleur designs, due to less belt slack in the system and a static external belt-line (only two external, outer cogs).

Additionally, and among other benefits, illustrative embodiments and examples described herein allow shifting under higher loads than with known derailleur designs and bottom bracket gearboxes, due to maintaining belt alignment while the shifting gear experiences no load until the gear is in place in the drive-line. This arrangement may also permit the motor to be operated at a substantially constant RPM (or small range of RPM) both at and during transition between the various gear ratios, contributing to motor efficiency and lifespan.

Additionally, and among other benefits, illustrative embodiments and examples described herein allow simpler E-bike motor integration as compared with known derailleur designs and hub-located gearboxes, with the ability to integrate the gearbox either before or after adding electromechanical inputs.

Additionally, and among other benefits, illustrative embodiments and examples described herein allow easier standard maintenance as compared with existing derailleur designs, as the gearbox is fully enclosed and protected from the elements.

Additionally, and among other benefits, illustrative embodiments and examples described herein provide improved durability (specifically in the rear end), as compared with known derailleur designs. This is a result of fewer expensive and delicate parts being exposed to possible blunt trauma, and to elements like dust, grease, and water.

Additionally, and among other benefits, illustrative embodiments and examples described herein have a smaller distance to point of control as compared to known derailleur designs and hub-located gearboxes, allowing for smaller shifter cable runs and/or smaller wireless transmission capabilities, for the purpose of control.

Additionally, and among other benefits, illustrative embodiments and examples described herein provide more options for wheel building as compared to known derailleur designs, due to more space on the rear hub. This is because only one cog is required as opposed to multiple cogs.

Additionally, and among other benefits, illustrative embodiments and examples described herein provide better handling as compared to known hub-located gearboxes, as a result of weight shifting lower and toward the center of the bike.

Additionally, and among other benefits, illustrative embodiments and examples described herein utilize cost-effective replacement parts due to simple geometries and manufacturing processes, and are lighter overall than other known solutions.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A gearbox for a vehicle, the gearbox comprising:
a shaft configured to rotate about a shaft axis;
a gear cluster fastened to the shaft, the gear cluster comprising a plurality of coaxial gears including a first gear and a second gear, wherein the first gear is physically divided into a plurality of first gear segments;
a continuous belt engaging the gear cluster, such that the belt defines a plane, wherein the first gear segments are each movable into and out of the plane; and
a shifting system including an actuator configured to selectively urge each respective first gear segment into and out of the plane independently of the other first gear segments.

2. The gearbox of claim 1, wherein the second gear is physically divided into a plurality of second gear segments.

3. The gearbox of claim 2, wherein each one of the first gear segments is arranged in a respective pair with a respective one of the second gear segments.

4. The gearbox of claim 3, wherein the respective first gear segment of each of the pairs is directly coupled to the respective second gear segment.

5. The gearbox of claim 3, wherein the respective first gear segment of each of the pairs has a fixed relationship with the respective second gear segment.

6. The gearbox of claim 3, wherein the actuator is configured to automatically urge the respective second gear segment into the plane when selectively urging each of the first gear segments out of the plane.

7. A gearbox for a vehicle, the gearbox comprising:
a shaft configured to rotate about a shaft axis;

a gear cluster fastened to the shaft, the gear cluster comprising a plurality of coaxial gears including a first gear and a second gear, wherein the first gear is physically divided into a plurality of first gear segments;

a continuous chain engaging the gear cluster, such that the chain defines a plane, wherein the first gear segments are each movable into and out of the plane; and a shifting system including an actuator configured to selectively urge each respective first gear segment into and out of the plane independently of the other first gear segments.

8. The gearbox of claim 7, wherein the second gear is physically divided into a plurality of second gear segments.

9. The gearbox of claim 8, wherein each one of the first gear segments is arranged in a respective pair with a respective one of the second gear segments.

10. The gearbox of claim 9, wherein the respective first gear segment of each of the pairs has a fixed relationship with the respective second gear segment.

11. The gearbox of claim 9, wherein the actuator is configured to automatically urge the respective second gear segment into the plane when selectively urging each of the first gear segments out of the plane.

12. The gearbox of claim 9, wherein the actuator is configured to automatically urge the respective second gear segment out of the plane when selectively urging each of the first gear segments into the plane.

13. A drivetrain for a gearbox, the drivetrain comprising:
a shaft configured to rotate about a shaft axis;
a gear cluster coupled to the shaft, the gear cluster comprising a plurality of coaxial gears including a first gear and a second gear, wherein the first gear is physically divided into a plurality of first gear segments;

a continuous power transmission element engaging the gear cluster, such that the power transmission element defines a plane, wherein the first gear segments are each movable into and out of the plane; and a shifting system including an actuator configured to selectively urge each respective first gear segment into and out of the plane independently of the other first gear segments.

14. The drivetrain of claim 13, wherein the second gear is physically divided into a plurality of second gear segments.

15. The drivetrain of claim 14, wherein each segment of the first gear segments is paired with a respective segment of the second gear segments.

16. The drivetrain of claim 15, wherein the respective first gear segment of each of the pairs is directly coupled to the respective second gear segment.

17. The drivetrain of claim 15, wherein the actuator is configured to automatically urge the respective second gear segment into the plane when selectively urging each of the first gear segments out of the plane.

18. The drivetrain of claim 15, wherein the actuator is configured to automatically urge the respective second gear segment out of the plane when selectively urging each of the first gear segments into the plane.

19. A gearbox comprising the drivetrain of claim 13.

* * * * *